United States Patent
Lim et al.

(10) Patent No.: US 10,706,556 B2
(45) Date of Patent: Jul. 7, 2020

(54) SKELETON-BASED SUPPLEMENTATION FOR FOREGROUND IMAGE SEGMENTATION

(71) Applicant: MICROSOFT TECHNOLOGY LICENSING, LLC, Redmond, WA (US)

(72) Inventors: Se Hoon Lim, Bellevue, WA (US); Timothy Andrew Large, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 140 days.

(21) Appl. No.: 15/975,740

(22) Filed: May 9, 2018

(65) Prior Publication Data

US 2019/0347803 A1 Nov. 14, 2019

(51) Int. Cl.
*G06T 7/00* (2017.01)
*G06T 7/194* (2017.01)
*G06T 7/215* (2017.01)
*G06T 7/50* (2017.01)
*G06T 7/13* (2017.01)
*G06T 5/00* (2006.01)

(52) U.S. Cl.
CPC .............. *G06T 7/194* (2017.01); *G06T 5/002* (2013.01); *G06T 7/13* (2017.01); *G06T 7/215* (2017.01); *G06T 7/50* (2017.01); *G06T 2207/20044* (2013.01)

(58) Field of Classification Search
CPC ........... G06T 7/194; G06T 7/215; G06T 7/50; G06T 7/13; G06T 5/002; G06T 2207/20044
See application file for complete search history.

(56) References Cited

U.S. PATENT DOCUMENTS

| 6,269,195 B1 | 7/2001 | Gonsalves et al. |
| 8,502,868 B2 | 8/2013 | Buehler et al. |
| 8,509,545 B2 | 8/2013 | Dedhia et al. |

(Continued)

OTHER PUBLICATIONS

Yanli Li et al, "Combining Shape and Appearance for Automatic Pedestrian Segmentation", Tools With Artificial Intelligence (ICTAI), 2011 23rd IEE International Conference On, IEEE, Nov. 7, 2011 (Nov. 7, 2011), pp. 369-376, XP032074587) (Year: 2011),*

(Continued)

*Primary Examiner* — Ping Y Hsieh
(74) *Attorney, Agent, or Firm* — NovoTechIP International PLLC

(57) ABSTRACT

Systems and methods for foreground image segmentation, which receive image data captured at a first time, generate a skeleton model of a foreground subject captured in the image data, generate an initial foreground mask for a foreground segment including the foreground subject, generate secondary points corresponding to the foreground subject, identify supplemental points for the foreground segment based on at least the secondary points and the skeleton model, combine the supplemental points with the initial foreground mask to obtain a combined mask, obtain a foreground segment mask for the foreground subject based on the combined mask, and apply the foreground segment mask to the image data to obtain a foreground image portion for the foreground subject.

20 Claims, 13 Drawing Sheets

(56) References Cited

U.S. PATENT DOCUMENTS

| | | |
|---|---|---|
| 8,731,330 B2 | 5/2014 | Sudheendra et al. |
| 8,896,655 B2 | 11/2014 | Mauchly et al. |
| 9,055,186 B2 | 6/2015 | Lin et al. |
| 9,064,318 B2 | 6/2015 | Price et al. |
| 9,154,697 B2 | 10/2015 | Geiss et al. |
| 9,530,044 B2 | 12/2016 | Nguyen et al. |
| 9,628,722 B2 | 4/2017 | Do et al. |
| 9,633,270 B1 | 4/2017 | Tangeland et al. |
| 9,794,588 B2 | 10/2017 | Dong et al. |
| 10,122,969 B1 | 11/2018 | Lim et al. |
| 2004/0252886 A1 | 12/2004 | Pan et al. |
| 2005/0180656 A1 | 8/2005 | Liu et al. |
| 2005/0271273 A1 | 12/2005 | Blake et al. |
| 2006/0228002 A1 | 10/2006 | Zitnick, III et al. |
| 2008/0181507 A1 | 7/2008 | Gope et al. |
| 2009/0232353 A1* | 9/2009 | Sundaresan ........ G06K 9/00342 382/103 |
| 2010/0197390 A1* | 8/2010 | Craig ................. G06K 9/00369 463/30 |
| 2012/0011454 A1 | 1/2012 | Droz et al. |
| 2012/0026277 A1 | 2/2012 | Malzbender et al. |
| 2012/0050458 A1 | 3/2012 | Mauchly et al. |
| 2012/0327172 A1* | 12/2012 | El-Saban ........... G06K 9/00228 348/14.02 |
| 2013/0021428 A1 | 1/2013 | Byers et al. |
| 2013/0048722 A1 | 2/2013 | Davis et al. |
| 2013/0057654 A1 | 3/2013 | Rafii et al. |
| 2013/0129155 A1 | 5/2013 | Lee et al. |
| 2013/0129227 A1* | 5/2013 | Mathe ................ G06K 9/00342 382/203 |
| 2013/0136358 A1* | 5/2013 | Dedhia ................ G06K 9/3241 382/173 |
| 2013/0208983 A1 | 8/2013 | Rother et al. |
| 2013/0235224 A1 | 9/2013 | Park et al. |
| 2013/0242036 A1 | 9/2013 | Gorzynski et al. |
| 2014/0085245 A1 | 3/2014 | Baldwin et al. |
| 2014/0126821 A1 | 5/2014 | Criminisi et al. |
| 2015/0029294 A1 | 1/2015 | Lin et al. |
| 2015/0091891 A1 | 4/2015 | Raheman et al. |
| 2015/0154447 A1 | 6/2015 | Wilson et al. |
| 2015/0248765 A1 | 9/2015 | Criminisi et al. |
| 2015/0310256 A1 | 10/2015 | Ahmad et al. |
| 2015/0334398 A1* | 11/2015 | Socek ....................... G06T 7/11 375/240.26 |
| 2016/0196675 A1 | 7/2016 | Kosmach et al. |
| 2017/0006260 A1 | 1/2017 | Fogarty et al. |
| 2017/0358092 A1* | 12/2017 | Bleibel ................... G06T 7/194 |
| 2019/0182453 A1 | 6/2019 | Lim et al. |

OTHER PUBLICATIONS

"Non Final Office Action Issued in U.S. Appl. No. 16/181,103", dated Jul. 12, 2019, 9 Pages.

International Search Report & Written Opinion Issued in PCT Application No. PCT/US2019/029530, dated Jul. 23, 2019, 12 Pages.

Li, et al., "Combining Shape and Appearance for Automatic Pedestrian Segmentation", In Proceedings of 23rd International Conference on Tools with Artificial Intelligence, Nov. 7, 2011, pp. 369-376.

Saad, et al., "Real Time Object Oriented 6-Point Skeleton Extraction Component from Human Silhouette for Video Surveillance and Analysis Application", In International Visual Informatics Conference, Advances in Visual Informatics, Oct. 27, 2015, pp. 367-380.

"Notice of Allowance Issued in U.S. Appl. No. 15/835,413", dated Jul. 11, 2018, 12 Pages.

"International Search Report and Written Opinion Issued in PCT Application No. PCT/US18/048654", dated Jan. 18, 2019, 21 pages.

Chaurasia, et al., "Silhouette-Aware Warping for Image-Based Rendering", n Proceedings of Eurographics Symposium on Rendering, vol. 30, No. 4, Jun. 27, 2011.

Chen, et al., "Motion-Aware Gradient Domain Video Composition", In Journal of IEEE Transactions on Image Processing, vol. 22, Issue 7, Jul. 2013, pp. 1-13.

"FIR Filtering and Image Processing", In Publication of University of Michigan—EECS 206, Jun. 21, 2002, pp. 112-126 (available at http://www.eecs.umich.edu/courses/eecs206/archive/spring02/lab.dir/Lab6/lab6_v3_0_release.pdf).

Nguyen, et al., "ITEM: Immersive Telepresence for Entertainment and Meetings—A Practical Approach", In IEEE Journal of Selected Topics in Signal Processing, vol. 9, No. 3, Apr. 2015, pp. 1-14.

Revathi, et al., "Certain Approach of Object Tracking using Optical Flow Techniques", In International Journal of Computer Applications, vol. 53, No. 8, Sep. 2012, pp. 50-57.

"Video and Image Processing Design Example", In Publication of Altera Corporation, Application Note AN-427-10.2, Feb. 2013, pp. 1-48.

Weiskopf, Daniel, "GPU-Based Interactive Visualization Techniques", In Publication of Springer Science & Business Media, Oct. 13, 2006, p. 195.

* cited by examiner

SKELETON-BASED SUPPLEMENTATION FOR FOREGROUND IMAGE SEGMENTATION

BACKGROUND

Accurate and robust foreground image segmentation is a computationally expensive process requiring significant resources to perform in real time. Although there are various segmentation techniques that are far less computationally expensive, such as simple thresholding using depth images, a significant shortcoming of those techniques is inaccurate segmentation that conventionally has been difficult to correct with automated techniques. For example, many such segmentation techniques fail to label pixels at or near edges of foreground portions of images.

SUMMARY

A system for foreground image segmentation, in accord with a first aspect of this disclosure, includes an imaging camera configured to capture image data at a first time, a skeleton model generator configured to generate a skeleton model of a foreground subject captured in the image data, and an initial foreground mask generator configured to generate an initial foreground mask for a foreground segment including the foreground subject. The system also includes a secondary point generator configured to generate a first plurality of secondary points corresponding to the foreground subject. The system further includes a foreground segmenter, which includes a skeleton-based reconstructor configured to identify supplemental points for the foreground segment based on at least the first plurality of secondary points and the skeleton model, a foreground mask combiner configured to combine the supplemental points with the initial foreground mask to obtain a combined mask. The foreground segmenter is configured to obtain a foreground segment mask for the foreground subject based on the combined mask. The system further includes a foreground image generator configured to apply the foreground segment mask to the image data to obtain a foreground image portion for the foreground subject.

A method for foreground image segmentation, in accord with a second aspect, includes receiving image data captured at a first time, generating a skeleton model of a foreground subject captured in the image data, generating an initial foreground mask for a foreground segment including the foreground subject, and generating a first plurality of secondary points corresponding to the foreground subject. The method further includes identifying supplemental points for the foreground segment based on at least the first plurality of secondary points and the skeleton model, combining the supplemental points with the initial foreground mask to obtain a combined mask, obtaining a foreground segment mask for the foreground subject based on the combined mask, and applying the foreground segment mask to the image data to obtain a foreground image portion for the foreground subject.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 8A illustrates a skeleton model for a foreground subject in a portion of an RGB image. FIG. 8B illustrates an example of identifying a region of a supplemental foreground mask for a line segment located near a neck joint. FIG. 8C illustrates examples of identifying regions of a supplemental foreground mask for two line segments located near a shoulder joint. FIG. 8D illustrates examples of identifying regions of a supplemental foreground mask for two line segments between two bones.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles unless expressly indicated.

Segmentation of objects in a scene is often referred to as background subtraction or foreground segmentation, and is a critical early step in most computer vision applications in domains such as surveillance and human-computer interaction, among other areas. However, as noted above, the process remains computationally expensive process and requires significant resources to perform in real time. The following disclosure presents systems and methods for providing highly accurate and automated foreground segmentation. In some cases, the proposed systems and methods are configured to label pixels at or near edges of foreground portions of images with a large degree of precision.

Figure 1:
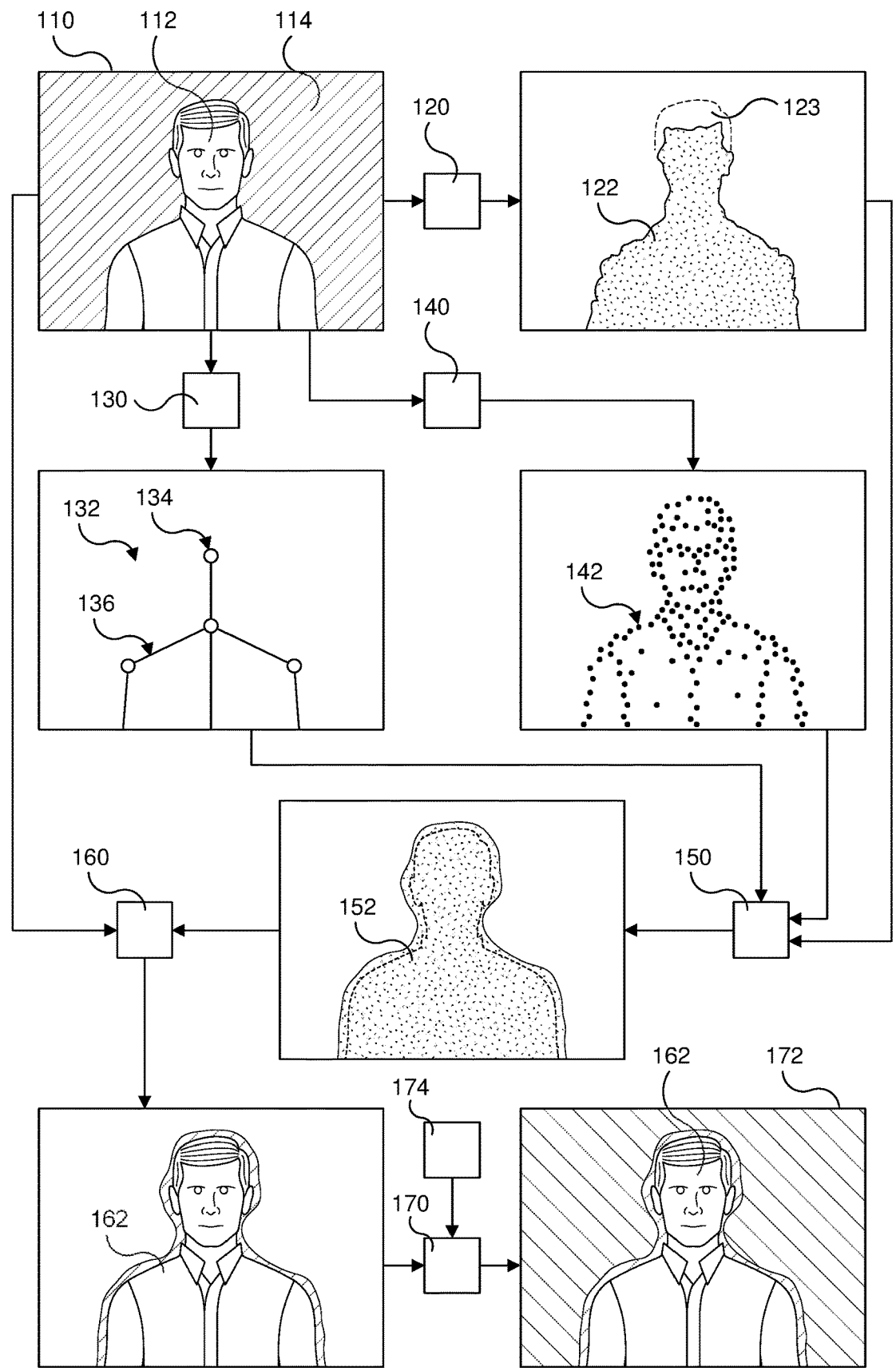
FIG. 1 illustrates an example of use of skeleton-based edge reconstruction for foreground image segmentation.

FIG. 1 illustrates an example of use of skeleton-based edge reconstruction for foreground image segmentation. In this example, a current frame 110 (which may be referred to as a "current image") has been obtained that captures, at a first time, a human foreground subject 112 within a scene including a background portion 114. In the figures, the terms "foreground" and "background" may be abbreviated as "FG" and "BG." The current frame 110 may be included among additional image data also used for processing the current frame 110. The additional image data may include, for example, images captured before the first time, images captured by other cameras of a same type used to capture the current frame 110, and/or images captured by other cameras of a different type. In this particular example, the current frame 110 is an RGB (red-green-blue) image captured by an RGB imaging camera. However, it is noted that the techniques described herein are applicable more generally for foreground segmentation of other types of image data including, but not limited to, infrared images.

An initial foreground mask generator 120 produces an initial foreground mask 122 (which may be referred to as an "initial foreground subject mask") for the current frame 110. Various techniques may be used to generate the initial foreground mask 122, including, but not limited to, depth image processing and machine learning-based techniques. In the example illustrated in FIG. 1, the initial foreground mask 122 has been generated using a depth image obtained from a time of flight depth camera. As shown in FIG. 1, the initial foreground mask 122 incompletely identifies pixels in the current frame 110 that correspond to the foreground subject 112. Time of flight depth cameras, and other sensors, do not accurately estimate distances for certain surfaces, such as hair and peripheral edges, resulting in those surfaces not being included in the initial foreground mask 122. For example, the initial foreground mask 122 shown in FIG. 1 does not include a region 123 corresponding to hair. The techniques described herein identify additional portions of the current frame 110 that correspond to the foreground subject 112, and combine those additional portions with the initial foreground mask 122 to produce a more complete and accurate foreground subject mask 152.

A skeleton model generator 130 is used to produce a skeleton model 132, which is depicted graphically in FIG. 1. The skeleton model 132 may, for example, identify vertices 134, referred to as "joints," for various portions or features of the foreground subject 112 and segments 136, referred to as "bones," that connect the vertices 134, although the skeleton model 132 may describe other features instead of or in addition to such vertices 134 and segments 136. The skeleton model 132 may be generated based on the current frame 110, the above noted-additional image data, and/or data from other sensors. For example, machine learning techniques may be applied to RGB image data, infrared image data, stereoscopic image data, and/or depth image data to estimate the positions of the nodes.

A secondary point generator 140 is used to identify secondary points 142 in the current frame 110 that are likely to correspond to the foreground subject 112. In the example illustrated in FIG. 1, the secondary points 142 have been identified using optical flow processing of the current frame 110 and previously captured images. The secondary points 142 shown in FIG. 1 include points not included in the initial foreground mask 122, which are used in combination with the skeleton model 132 to identify additional portions of the current frame 110 that correspond to the foreground subject 112 to supplement and more fully complete the initial foreground mask 122.

A foreground segmenter 150 generates the foreground subject mask 152 based on the initial foreground mask 122, the skeleton model 132, and the secondary points 142, as will be detailed below. As can be seen in FIG. 1, the resulting foreground subject mask 152 is substantially more complete than the initial foreground mask 122. A foreground image generator 160 then applies the resulting foreground subject mask 152 to the current frame 110 to produce a foreground image portion 162 corresponding to the foreground subject 112 and substantially excluding the background portion 114 of the current frame 110. An image compositor 170 then composites the foreground image portion 162 with a background image 174 (which may be referred to as a "background"), resulting in a composite image 172 in which the foreground subject 112 in the current frame 110 is shown on the new background 174.

Figure 2:
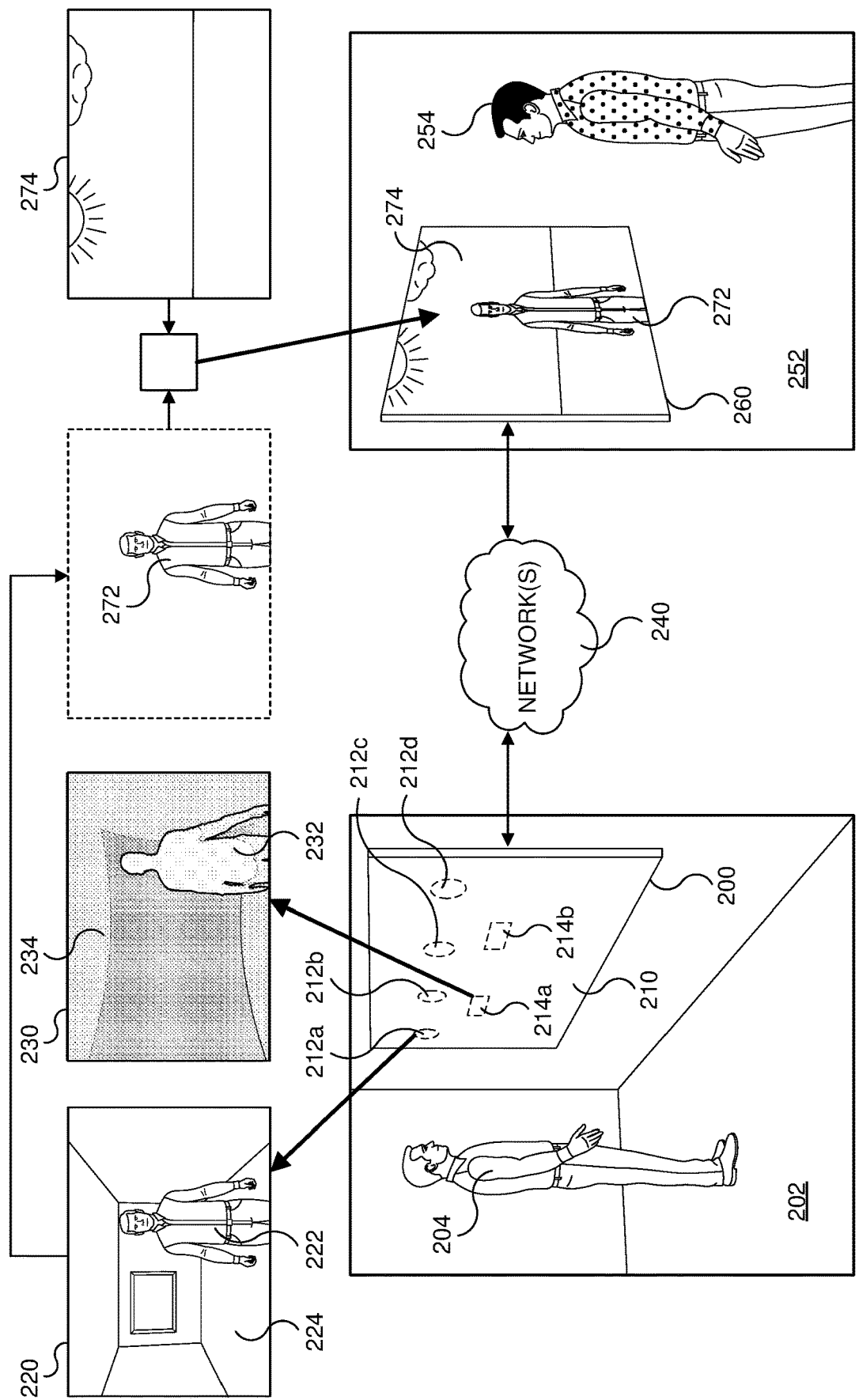
FIG. 2 illustrates an example of use of a video capture system employing techniques described herein.

FIG. 2 illustrates an example of use of a video capture system 200 employing techniques described herein. A video capture system 200 is being used to provide a video stream to a remote display system 260. In the example illustrated in FIG. 2, the video capture system 200 (which may also be referred to as a "local video capture system") is embodied as an interactive display system that also includes a display screen 210 for presenting images, although it is noted that the video capture system 200 is not limited to such embodiments. For example, in some implementations, the video capture system 200 may not include a display screen. The display screen 210 is positioned to present images to users at a first geographic location 202 (which may be referred to as a "scene") such as a human foreground subject 204 (who may be referred to as a "user" of the video capture system 200). The foreground subject 204 is in close proximity to the video capture system 200 relative to other features in the scene 202. In some implementations, the video capture system 200 is configured to segment images for multiple concurrent foreground subjects.

In the example illustrated in FIG. 2, the video capture system 200 is configured to, among other things, serve as an endpoint in a video conferencing session. At the time illustrated in FIG. 2, the user 204 is participating in the video conferencing session. In some circumstances, there may be multiple participants at the geographic location for the video conferencing session; for example, participants seated behind the user 204. The term "video conferencing" applies to electronic communications in which a video stream including images captured by a first participant system is received and displayed by at least a second participant system, and may include, but does not require, the first participant system displaying a video stream provided by the second participant system.

The illustrated video conferencing session includes another participant 254 at a second location 252, who is participating via the remote display system 260 configured to serve as an endpoint in the video conferencing session. In some examples, the remote display system 260 may be substantially similar to the illustrated embodiment of the video capture system 200. However, the remote display system 260 may include conventional video conferencing systems adapted to display a video stream provided in a video conferencing session, but which do not include or implement various features described herein for the video capture system 200. The remote display system 260 receives the video stream via one or more data communication networks 240. It is noted that the video capture system 200 is not necessarily limited to video conferencing activities. For example, the video capture system 200 may provide a virtual whiteboard or run arbitrary computer program applications, and display information and/or user interfaces for such other activities on the display screen 210. Such other activities may be performed during a video conferencing session.

The video capture system 200 includes a plurality of RGB imaging cameras 212a, 212b, 212c, and 212d (collectively referred to as "RGB cameras 212") positioned behind the display screen 210 to capture images through the display screen 210. The video capture system 200 may be configured to dynamically select an RGB camera 212 providing a best view of a subject, as discussed in U.S. patent application Ser. No. 15/835,413 (filed on Dec. 7, 2017 and entitled "Video Capture Systems and Methods"), which is incorporated by reference herein in its entirety. Although the example illustrated in FIG. 2 includes four RGB cameras 212, in other implementations there may one or more RGB cameras 212. In some implementations, the RGB cameras 212 are configured and operated to periodically capture images at a frame rate suitable for In some implementations, the video capture system 200 includes one or more depth cameras 214 positioned behind the display screen 210, such as the two depth cameras 214a and 214b illustrated in FIG. 2. In the example shown in FIG. 2, the depth cameras 214 are positioned behind the display screen 210 to perform measurements through the display screen 210. As described in more detail below, the depth cameras 214 may be used to, among other things, determine when a subject has come into proximity to the video capture system 200, and/or identify discontinuities in a depth image and related depth image data used to perform image segmentation for a subject.

FIG. 2 shows an RGB image 220 of the scene 202 that has been captured by the RGB camera 212a at a first time. The RGB image 220 includes a foreground portion 222 in which the foreground subject 204 is visible and a background portion 224 showing other portions of the scene 202 within the field of view of the RGB camera 212a. FIG. 2 also shows a depth image 230 (which may be referred to as a "depth map") captured by the depth camera 214a at the first time. The depth image 230 includes a foreground portion 232 corresponding to the foreground subject 204 and a background portion 234 showing other portions of the scene 202 within the field of view of the depth camera 214a.

The foreground portion 222 has been isolated from the RGB image 220 to obtain a foreground image portion 272 which is composited with a new background image 274 to produce a composite image, much as described for the foreground image portion 162 and the background image 174 in FIG. 1. The composite image is digitally encoded, for example, but not limited to, as a frame of a video stream. The encoded image is then provided to the remote display system 260, thereby causing the composite image to be displayed, at least in part, as an image on the remote display system 260, such as via a video conferencing application program executed by the remote display system 260. Similar processing may be performed to generate a sequence of multiple composite images based on images captured by the RGB cameras 212, used for a sequence of frames that are encoded in the video stream transmitted to participants in the video conferencing session.

Although in FIG. 2 various elements and features of the video capture system 200 are described as being integrated into a single device, in other implementations, various elements and features of the video display system 200 may be implemented across multiple devices. For example, selected operations may be performed by a computer system not within the illustrated enclosure of the video capture system 200, some or all of the RGB cameras 212 may be included in one or more separate devices instead of being positioned behind the display screen 210 or otherwise not positioned within the illustrated enclosure of the video capture system 200, and/or some or all of the depth cameras 214 may be included in one or more separate devices instead of being positioned behind the display screen 210 or otherwise not positioned within the illustrated enclosure of the video capture system 200.

Figure 3:
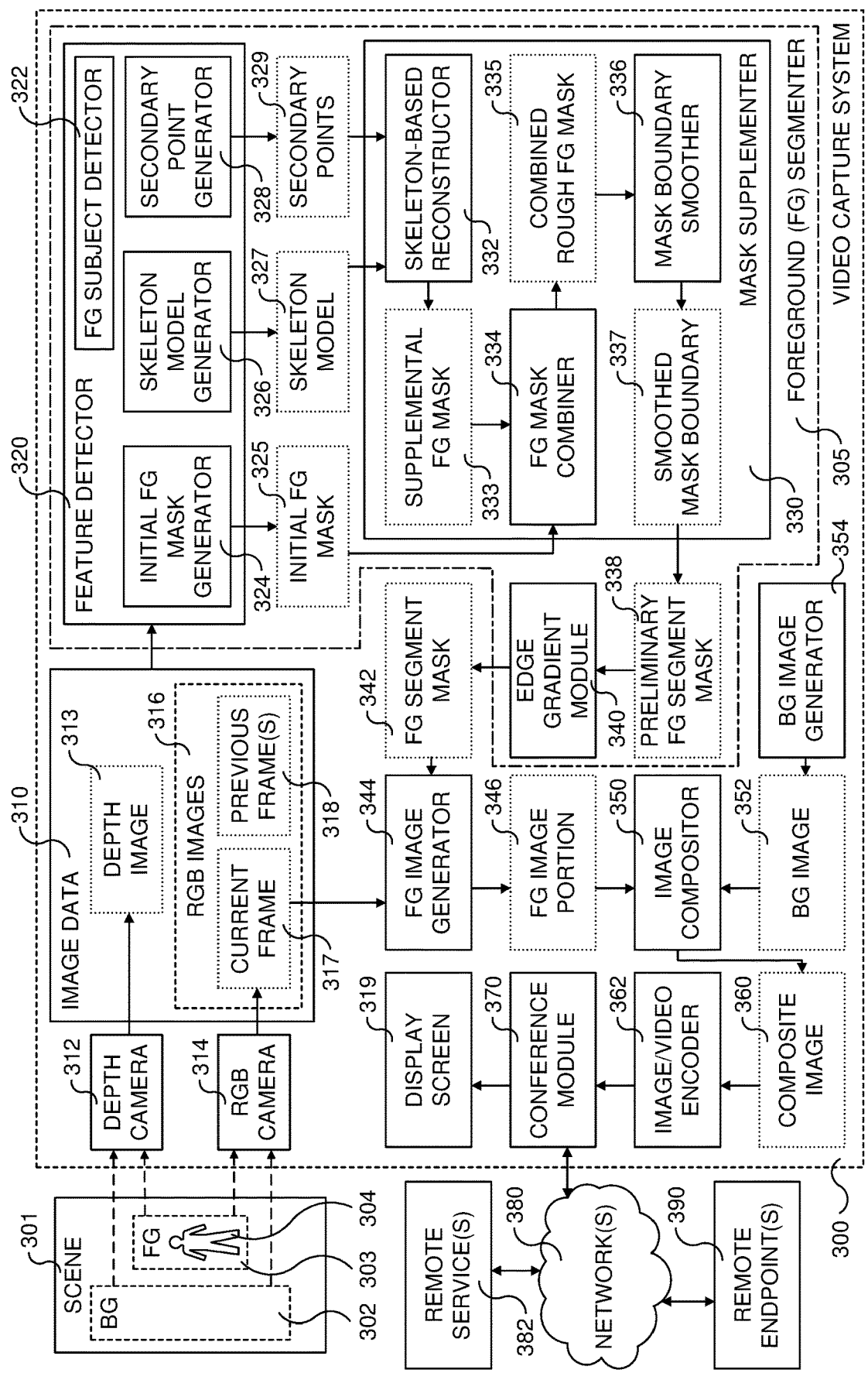
FIG. 3 illustrates an example video capture system implementing various features described herein.

FIG. 3 illustrates an example video capture system 300 implementing various features described herein. The video capture system 300 may include any of the features described above in FIGS. 1 and 2. Additionally, features described for the video capture system 300 may be included in the video capture system 200 in FIG. 2. Much as described above for the video capture system 200, the video capture system 300 includes at least one RGB imaging camera 314 (which may be referred to as an "RGB camera") arranged to capture RGB images 316 of a scene 301. The RGB images 316 are stored in a memory and include a current frame 317 (which may be referred to as a "current image") captured by the RGB camera 314 at a first time and one or more previous frame(s) 318 captured shortly before the first time. For example, to capture frames for video capture, the RGB camera 314 may be configured to capture successive image frames at a first frame rate, including successive frames consisting of the previous frame(s) 318 and the current frame 317. The RGB images 316 are included in image data 310. The RGB images 316 captured by the RGB camera 314 may include images of a background portion 302 (or "background 302") of the scene 301 and/or a foreground portion 303 of the scene 301, which may include a foreground subject 304 (such as, but not limited to, a human foreground subject) in closer proximity to the RGB camera 314. In some implementations, the video capture system 300 includes a display screen 319 and the RGB camera 314 is positioned behind the display screen 319 to capture RGB images 316 using light received through the display screen 319, much as illustrated in FIG. 2.

In some implementations, the video capture system 300 includes at least one depth camera 312 configured to capture depth images that estimate distances from the depth camera 312 to surfaces in the scene 301. For example, the image data 310 includes a depth image 313 captured by the depth camera 312 at the first time that the current frame 317 was captured by the RGB camera 314. A depth image 313 captured at about the first time (for example, due to different frame rates used for the RGB camera 314 and the depth camera 312) is considered to have been captured at the first time. In some implementations, the depth camera 312 may be a time of flight (TOF) depth cameras (gated or phase-based), configured to determine the time for infrared light pulses emitted by the depth camera 312 to reflect from surfaces in scene 301 and be received by pixel sensor elements included in the depth camera 312. The time of flight determined for a pixel sensor corresponds to a distance between the depth camera 312 and a corresponding surface in the scene 301. In some implementations, the depth camera 312 may estimate distances based on reflections from the scene 301 of a structured infrared light projected by the depth camera 312. In some implementations, the depth camera 312 may include a hybrid sensor, capable of capturing both RGB images and depth images. In some implementations, a depth camera 312 may be provided by two or more cameras (for example, two infrared cameras and/or two RGB cameras 314) used for stereoscopic depth estimation. In some implementations, the video capture system 300 includes a display screen 319 and the depth camera 312 is positioned behind the display screen 319 to capture depth images using light received through the display screen 319, much as illustrated in FIG. 2.

The video capture system 300 includes a foreground segmenter 305 (which, in some implementations, may be referred to as a "foreground segmentation module") configured to, based on the image data 310, produce a foreground segment mask 342 for the foreground portion 303 captured in the current frame 317. The foreground segmenter 305 includes a feature detector 320 (which, in some implementations, may be referred to as a "feature detection module"), which is configured to identify image features for foreground subjects identified in the current frame 317 based on at least the image data 310 (including, for example, RGB images 316 and depth image 313). In some implementations, the foreground segmenter 305 is configured to, where multiple foreground subjects are detected, produce a respective foreground segment mask 342 for each foreground subject.

In some implementations, the feature detector 320 includes a foreground subject detector 322 (which, in some implementations, may be referred to as a "foreground subject detection module") configured to determine whether one or more foreground subjects, such as the foreground subject 304 in FIG. 2, are captured in the current frame 317. For example, RGB image processing techniques such as, but not limited to, face detection and/or optical flow analysis may be effective to determine, based on the RGB images 316, that a foreground subject is present and estimate a position or area in the current frame 317 for the foreground subject. Techniques for face detection are discussed in U.S. Patent Application Publication Number 2014/0133758, published on May 15, 2014 and entitled "Real-Time Face Detection Using Pixel Pairs," which is incorporated by reference herein in its entirety. In some implementations, an array of microphones (not illustrated in FIG. 3), included in the video capture system 300 system and/or positioned elsewhere, may be used to determine a position of a currently speaking subject.

The feature detector 320 includes an initial foreground mask generator 324 (which, in some implementations, may be referred to as an "initial foreground mask generation module") configured to produce an initial foreground mask 325 (which may be referred to as "initial foreground points"), as described in connection with the initial foreground mask generator 120 and initial foreground mask 122 in FIG. 1. The initial foreground mask 325 is an initial selection of a portion of the current frame 317 that corresponds to the foreground portion 303. In some implementations, the initial foreground mask generator 324 is configured to produce the initial foreground mask 325 based on at least the depth image 313. For example, this may be performed by a simple thresholding of depth image 313, such as discarding or ignoring depth estimates that exceed a first threshold distance. As another example, this may be performed based on at least discontinuities in the depth image 313 around an area indicated by the foreground subject detector 322. Positions from the foreground portion of the depth image 313 may then be transformed to corresponding positions in the current frame 317, resulting in a depth mask for the current frame 317. In some implementations, machine learning and inference techniques, such as semantic segmentation or semantic labeling, may be used. In some implementations, the initial foreground mask 325 is identified based on at least brightness, color, or other boundaries detected in the current frame 317, and/or grouping together adjacent pixels by texture, color, and/or intensity. In some examples, one or more graphical energy minimization techniques, such as, but not limited to the GrabCut method, may be used for image segmentation.

Various techniques for depth image and/or RGB image foreground/background segmentation are described in U.S. Patent Application Publication Numbers 2015/0310256 (published on Oct. 29, 2015 and entitled "Depth Image Processing"), 2015/0248765 (published on Sep. 3, 2015 and entitled "Depth Sensing Using an RGB Camera"), 2014/0126821 (published on May 8, 2014 and entitled "Foreground and Background Image Segmentation"), 2013/0208983 (published on Aug. 15, 2013 and entitled "Up-Sampling Binary Images for Segmentation"), 2013/0129227 (published on May 23, 2013 and entitled "Environment and/or Target Segmentation"), 2013/0129155 (published on May 23, 2013 and entitled "Motion Detection Using Depth Images"), and 2013/0057654 (published on Mar. 7, 2013 and entitled "Method and System to Segment Depth Images and to Detect Shapes in Three-Dimensionally Acquired Data"), and 2005/0271273 (published on Dec. 8, 2005 and entitled "Foreground Extraction Using Iterated Graph Cuts"), each of which are incorporated by reference herein in their entireties.

The feature detector 320 also includes a skeleton model generator 326 (which, in some implementations, may be referred to as a "skeleton model generation module") configured to generate a skeleton model 327, as described in connection with the skeleton model generator 130 and skeleton model 132 in FIG. 1.

The feature detector 320 also includes an secondary point generator 328 (which, in some implementations, may be referred to as a "secondary point generation module") configured to, based on at least the image data 310, identify secondary points 329 (which may be referred to as "supplemental points") that are likely to correspond to the foreground portion 303 captured in the current frame 317, as described in connection with the secondary point generator 140 and secondary points 142 in FIG. 1. Example techniques are described in connection with FIGS. 4 and 5 below. In some implementations, the secondary point generator 328 is configured to perform motion segmentation (which may be referred to as "motion-based segmentation") to identify the secondary points 329. The motion segmentation is performed on a plurality of the RGB images 316, such as the current frame 317 and one or more of the previous frame(s) 318, although other approaches may be used.

Techniques for motion estimation and segmentation include, but are not limited to optical flow techniques, block-based matching techniques, Maximum A posteriori Probability (MAP) techniques, and/or simultaneous motion estimation and segmentation techniques. In some examples, motion vectors are estimated for multiple regions and/or positions in the current frame 317, and a threshold set according to estimated motion may be applied to select particular regions or positions. For example, the threshold may be set to lower values for slow motion and higher values for faster motion. The threshold may vary across the current frame 317; for example, the foreground subject 304 may be moving their arms quickly with other body portions moving slowly. In some examples, a frame interval is adapted according to the estimated motion. Most motion estimation may be based on two successive frames. However, the motion of moving objects may be minimal, leading to a sparse motion field, in which case an interval of two frames may be automatically selected for one or more portions of the current frame 317. For a fast motion field, the interval can be set small, while for slow motion, the interval can be set large. To reduce computation cost, the motion segmentation may identify only a sparse set of secondary points 329, rather than attempt to perform a full segmentation; for example, the motion segmentation may focus on identifying edges of the foreground portion 303 and/or foreground subject 304.

Examples of optical flow, motion estimation, and motion segmentation techniques are described U.S. Patent Application Publication Numbers 2004/0252886 (published on Dec. 16, 2004 and entitled "Automatic Video Object Extraction"), 2006/0228002 (published on Oct. 12, 2006 and entitled "Simultaneous Optical Flow Estimation and Image Segmentation"), and 2015/0154447 (published on Jun. 4, 2015 and entitled "Fusing Device and Image Motion for User Identification, tracking and Device Association"), each of which is incorporated by reference herein in their entireties.

The foreground segmenter 305 includes a mask supplementer 330 (which, in some implementations, may be referred to as a "mask supplementation module") configured to supplement the initial foreground mask 325 based on at least the skeleton model 327 and the secondary points 329. The mask supplementer 330 includes a skeleton-based reconstructor 332 (which, in some implementations, may be referred to as a "skeleton-based reconstruction module") configured to generate a supplemental foreground mask 333 (which may be referred to as "supplemental foreground points") based on at least the skeleton model 327 and the secondary points 329. Example techniques are described in connection with FIGS. 6-9 below. In some implementations, the skeleton-based reconstructor 332 identifies portions of the supplemental foreground mask 333 based on arrangements of the secondary points 329 relative to nearby joints and/or bones of the skeleton model 327. The mask supplementer 330 includes a foreground mask combiner 334 (which, in some implementations, may be referred to as a "foreground mask combining module") configured to combine the supplemental foreground mask 333 with the initial foreground mask 325 to produce a combined rough foreground mask 335. Example techniques are described in connection with FIG. 10 below. For example, the combined rough foreground mask 335 may be produced as a union of the initial foreground mask 325 and the supplemental foreground mask 333. In some implementations, the skeleton-based reconstructor 332 and the foreground mask combiner 334 are combined and do not generate a discrete supplemental foreground mask 333; for example, regions or points identified by the skeleton-based reconstructor 332 may be directly combined into the initial foreground mask 325 to produce the combined rough foreground mask 335.

The mask supplementer 330 includes a mask boundary smoother 336 (which, in some implementations, may be referred to as a "mask boundary smoothing module") configured to perform a smoothing of one or more boundaries of the combined rough foreground mask 335 to produce a smoothed mask boundary 337. Example techniques are described in connection with FIGS. 11 and 12 below. The smoothing reduces the effect of perturbations in generating the initial foreground mask 325 as well as artificial perturbations introduced into the supplemental foreground mask 333. The foreground segmenter 305 is configured to produce a preliminary foreground segment mask 338 for the current frame 317 from the smoothed mask boundary 337. The resulting preliminary foreground segment mask 338 identifies a portion of the current frame 317 that corresponds to one or more foreground subjects 304. In some examples, the preliminary foreground segment mask 338 includes a binary bitmap identifying individual pixels of the current frame 317. In some examples, the preliminary foreground segment mask 338 specifies a plurality of coordinates that may be used to identify one or more regions of the current frame 317; for example, the coordinates may identify vertices of a polygon.

In some implementations, the foreground segmenter 305 includes an edge gradient module 340 configured to apply an alpha gradient to edges of the preliminary foreground segment mask 338 to produce the foreground segment mask 342 (which, in such implementations, may be referred to as a "foreground segment alpha mask"). Example techniques are described in connection with FIG. 13 below. For example, the preliminary foreground segment mask 338 may be convolved with a Gaussian blur. Use of the edge gradient for compositing the foreground segment reduces effects of overinclusiveness and/or underinclusiveness of the preliminary foreground segment mask 338, as well as differences in lighting of the foreground portion 303 and an image composited with a foreground segment. In some implementations, the preliminary foreground segment mask 338 is used as the foreground segment mask 342.

The video capture system 300 includes a foreground image generator 344 (which, in some implementations, may be referred to as a "foreground image generation module") configured to generate a foreground image portion 346 (which may be referred to as a foreground image segment") by applying the foreground segment mask 342 to the current frame 317. Example techniques are described in connection with FIG. 14 below. If the foreground segment mask 342 includes an alpha channel, the foreground image portion 346 may likewise include an alpha channel. The generated foreground image portion 346 is subsequently composited by an image compositor 350 with a background image 352, which may be provided by a background image generator 354 (which, in some implementations, may be referred to as a "background image generation module"), to produce a composite image 360 corresponding to the current frame 317, as described in connection with the image compositor 170 and composite image 172 in FIG. 1. In some examples, the background image 352 may be a static image. In some examples, the background image 352 may be dynamically generated by the background image generator 354. In some examples, multiple foreground image portions, for example, corresponding to different participants in a videoconferencing session, may be composited into the composite image 360. In some examples, the foreground image portion 346 may be selectively resized and/or repositioned from its original size or position in the current frame 317.

In some implementations, the video capture system 300 includes an image/video encoder 362 that encodes the composite image 360 as still image data and/or part of a series of frame images in a video stream. In some implementations, the video capture system 300 includes a video conferencing module 370 that is configured to establish and/or participate in a video conferencing session via network(s) 380 with one or more remote endpoint(s) 390, such as the remote display system 260 in FIG. 2. The network(s) 380 may include, for example, one or more wired or wireless data communication networks, and/or the Internet. The video conferencing module 370 may be implemented as an application program executed by the video capture system 300. In some implementations, the video capture system 300 may include a virtual webcam module (not illustrated in FIG. 3) configured to appear as a webcam or other video camera to application programs, including, for example, the video conferencing module 370. Accordingly, via the virtual webcam module, the composite image 360 for the current frame 317 and composite images for other frame may be used by conventional video conferencing application programs. By transmitting a video stream encoded by the image/video encoder 362 to a remote endpoint 390 for a video conferencing session, the video capture system 300 may cause the composite image 360, and other such composite images generated by the video capture system 300, to be displayed to a remote participant via the remote endpoint 390.

In some implementations, some of the operations described in connection with the video capture system 300 are performed by non-local systems or devices, such as remote service(s) 382 and/or remote endpoint(s) 380. In some examples, the remote services 382 may include all or part of the feature detector 320, mask supplementer 330, edge gradient module 340, foreground image generator 344, background image generator 354, image compositor 350, image/video encoder 362, and/or video conferencing module 370. In some examples, the remote participant system(s) 380 may include all or part of the edge gradient module 340, foreground image generator 344, background image generator 354, and/or image compositor 350.

Figure 4:
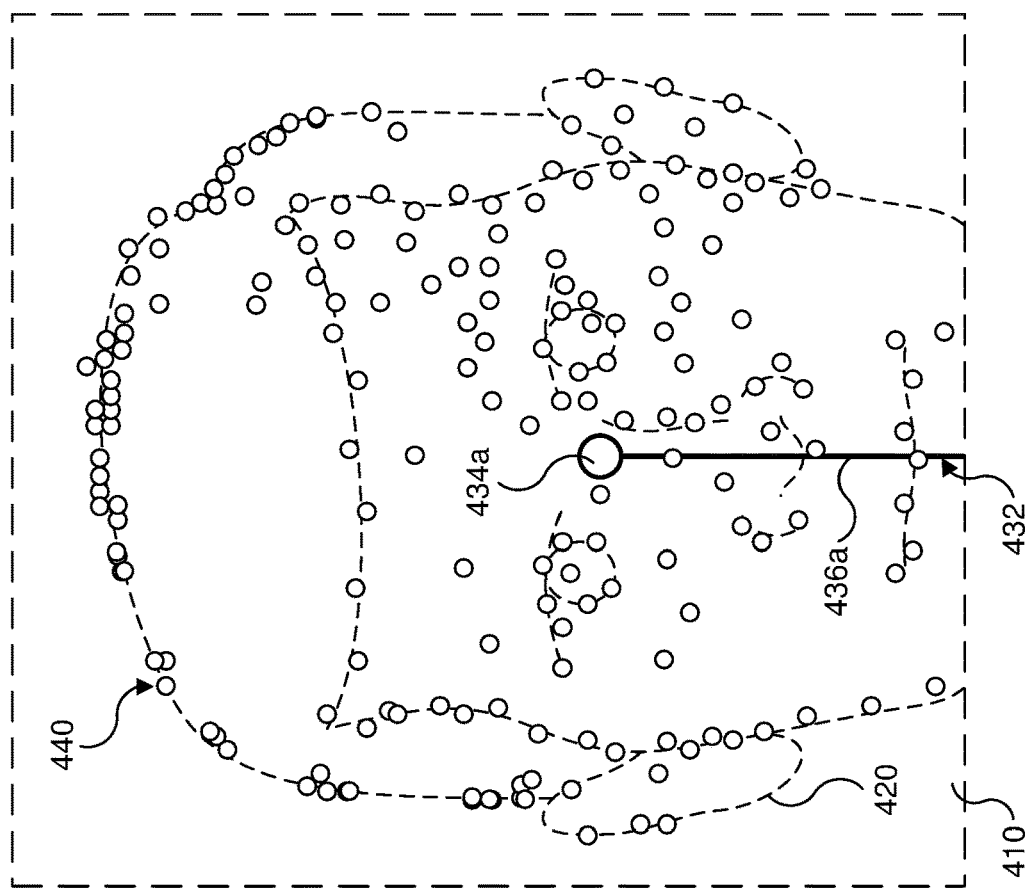
FIG. 4 illustrates an example of generation of secondary points by the foreground segmenter in FIG. 3 for a portion of a current frame.

FIG. 4 illustrates an example of generation of secondary points 440 by the foreground segmenter 305 in FIG. 3 for a portion 410 of a current frame 317. In this and related examples, the portion 410 of the current frame 317 has been taken from the current frame 110 shown in FIG. 1. The portion 410 of the current frame includes pixels for a human foreground subject 420 (illustrated in broken lines). A first joint 434a and a first bone 436a for a skeleton model (similar to the skeleton model 132 shown in FIG. 1) generated by the skeleton model generator 326 are shown. In this example, the secondary point generator 328 has performed optical flow analysis based on the current frame 317 and one or more previous frame(s) 318, resulting in a sparse set of secondary points 440 that correspond to the foreground subject 420. Optical flow analysis is useful for identifying points at edges of the foreground subject 420, which provides points not captured in an initial foreground mask generated based on a depth image, such as the initial foreground mask 122 shown in FIG. 1. The secondary points 440 may each correspond to exact or fractional pixel positions. In some examples, the secondary points 440 may be referred to as "raw secondary points."

Figure 5:
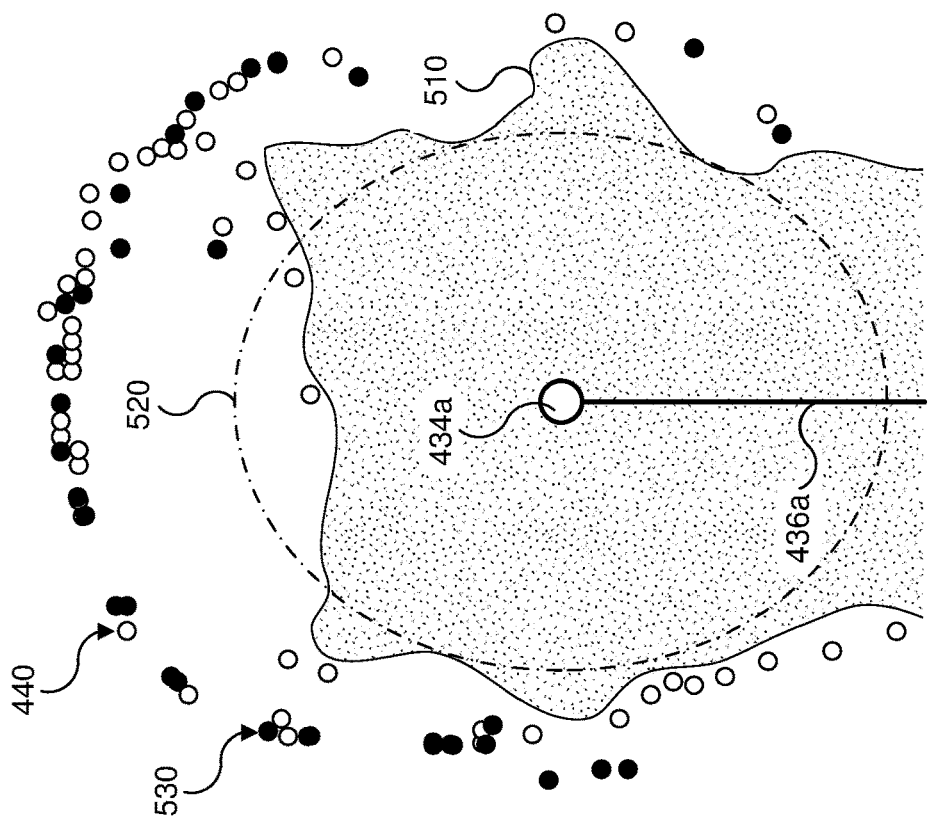
FIG. 5 illustrates selectively removing a portion of the raw secondary points shown in FIG. 4 based on at least an initial foreground mask and/or a skeleton model generated for the current frame.
Figure 10:
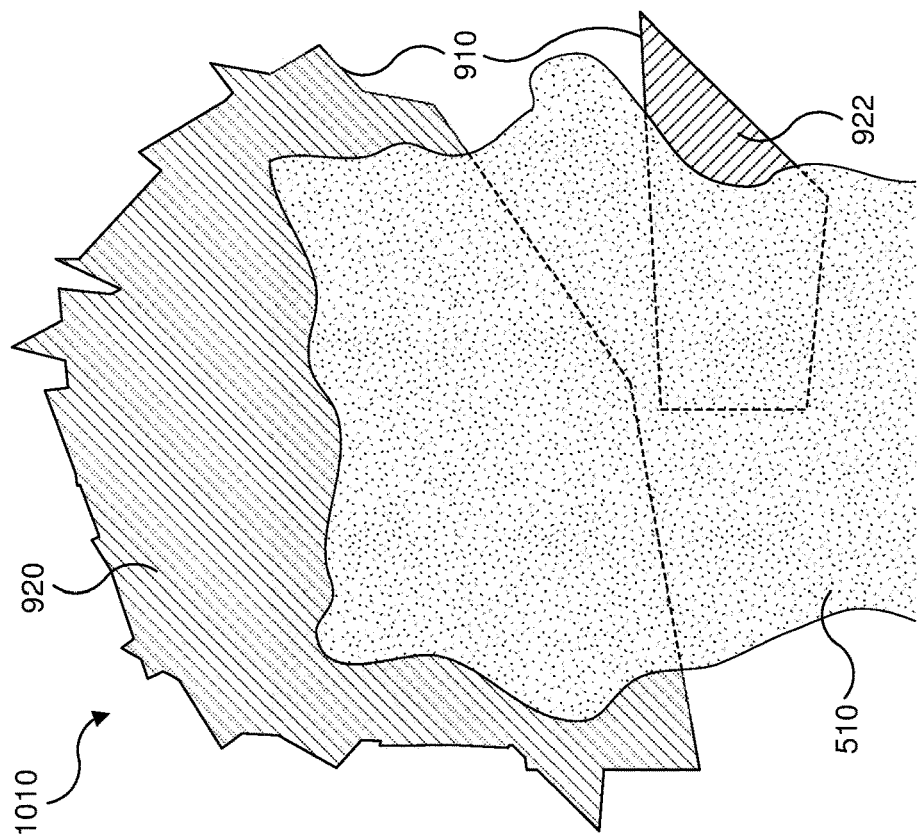
FIG. 10 illustrates a combined rough foreground mask resulting from combining the initial foreground mask and the supplemental foreground mask.

FIG. 5 continues the example shown in FIG. 4, and illustrates selectively removing a portion of the raw secondary points 440 shown in FIG. 4 based on at least an initial foreground mask 510 and/or a skeleton model generated for the current frame. In FIGS. 5 and 10, the initial foreground mask 510 is the same as the initial foreground mask 122 shown in FIG. 1. In some implementations, a first portion of the raw secondary points 440 is selected and removed based on proximities to the initial foreground mask 510, such as by selecting and removing raw secondary points 440 within or near the initial foreground mask 510. For example, the first portion of the raw secondary points 440 may be removed using a morphological erosion process with the initial foreground mask 510. In some implementations, a second portion of the raw secondary points 440 is selected and removed based on the skeleton model 327 produced by the skeleton model generator 326. For example, one or more regions may be identified based on joints or bones included in the skeleton model 327, and raw secondary points 440 within or near the one or more regions selected and removed.

For each of the identified regions, a size, shape, and/or orientation may be varied and determined for the region based on a type of joint and/or bone. For example, in FIG. 5 an elliptical region 520 has been identified for the first joint 434a based on the first joint 434a being a head joint, and raw secondary points 440 within the elliptical region 520 are selected and removed. In some implementations, redundancy in areas with higher densities of raw secondary points 440 is reduced, such as by use of grid multiplication. Other techniques may be applied for selecting and removing one or more portions of the raw secondary points 440. By reducing the number of secondary points 440, amounts of subsequent processing are substantially reduced without significantly affecting the accuracy of the resulting segmentation. In this example, thirty secondary points 530 (shaded in black in FIG. 5) remain from the removal of selected raw secondary points 440. In some implementations, where selection and removal are directed toward removing inner points, the remaining secondary points 530 may be referred to as "edge points" or "secondary edge points."

Figure 6:
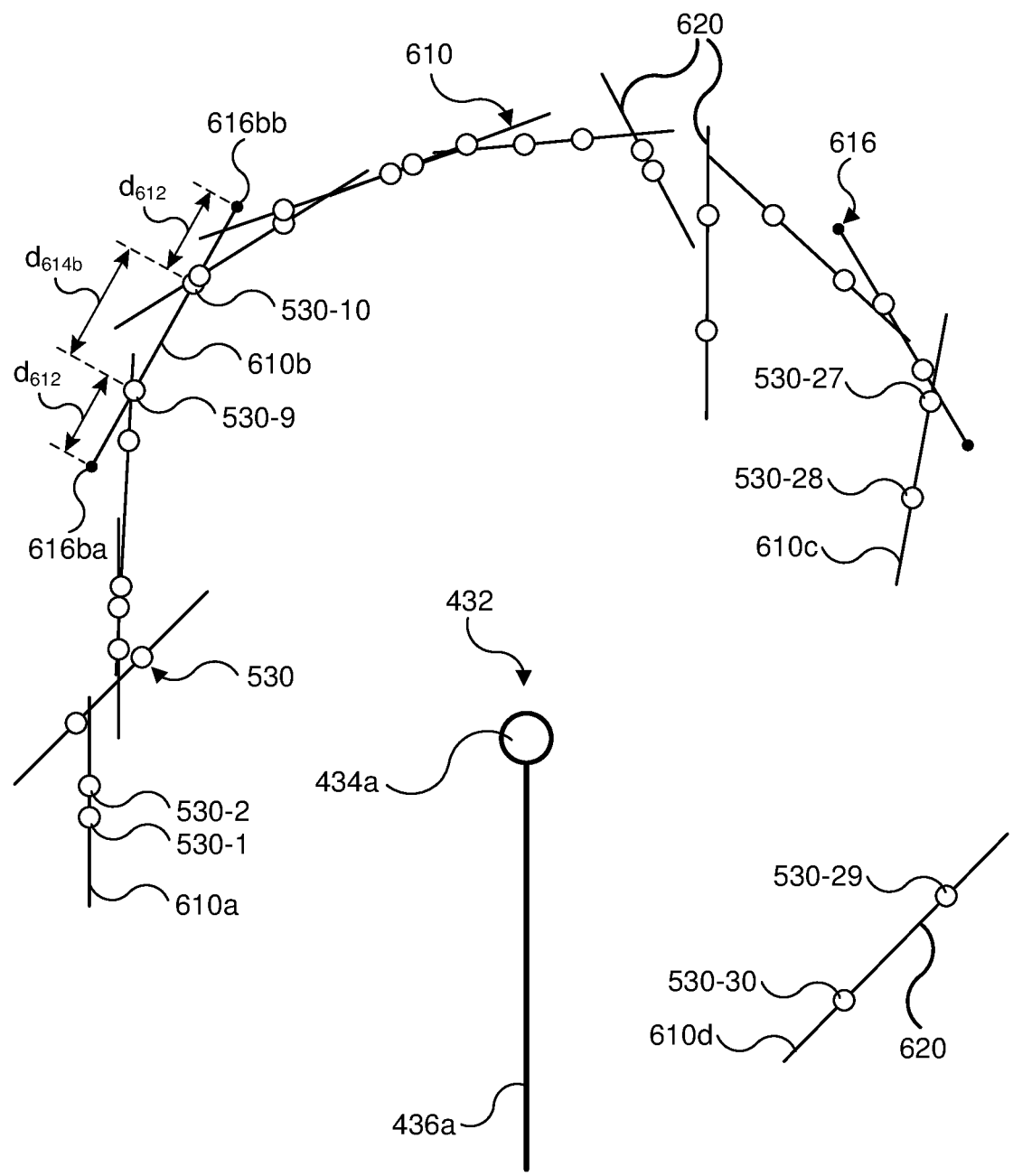
FIG. 6 illustrates a portion of an example edge reconstruction performed as part of a skeleton-based foreground mask reconstruction performed by the skeleton-based reconstructor in FIG. 3.

FIG. 6 continues the example shown in FIGS. 4-5, and illustrates a portion of an example edge reconstruction performed as part of a skeleton-based foreground mask reconstruction performed by the skeleton-based reconstructor 332 in FIG. 3. The thirty secondary points 530 in FIG. 5 are shown in FIG. 6, and enumerated, roughly clockwise, as secondary points 530-1 through 530-30 (although only some of the secondary points 530 are labeled in FIG. 6 with reference numerals).

In this example, the secondary points 530 are "edge points" estimated to be at or near an edge of the foreground subject in the current frame. However, the secondary points 530 do not provide a full edge of the foreground subject, as the secondary points 530 are sparsely distributed and/or a portion of the secondary points 530 may incorrectly estimate the actual edge. In some implementations, the skeleton-based reconstructor 332 is configured to reconstruct a more complete estimated edge 620 of a foreground segment mask based on the sparse secondary points 530. In some implementations, as illustrated in FIG. 6, the skeleton-based reconstructor 332 is configured to identify pairs of the secondary points 530, although in some examples other groups of secondary points 530 may be identified. For example, hierarchical clustering (also called hierarchical cluster analysis or HCA) may be applied to the secondary points 530 to build a hierarchy of clusters, and pairs of closely arranged secondary points 530 identified based on the hierarchical clustering. In some implementations, such clustering may be used as part of the removal of raw secondary points 440 described in FIG. 5, by removing raw secondary points 440 that are too closely clustered with one or more other raw secondary points 440. In FIG. 6, fifteen pairs are identified for the thirty secondary points 530, including a first pair consisting of secondary points 530-1 and 530-2, a second pair consisting of secondary points 530-9 and 530-10, a third pair consisting of secondary points 530-27 and 530-28, and a fourth pair consisting of secondary points 530-29 and 530-30.

In some implementations, after identifying the pairs of secondary points 530, the skeleton-based reconstructor 332 generates, for each pair of secondary points 530, a respective line segment 610 passing through the pair of secondary points 530, as illustrated in FIG. 6. For example, line segments 610a, 610b, 610c, and 610d respective passing through the first, second, third, and fourth pairs of secondary points 530. In some implementations, as illustrated in FIG. 6, the line segments 610 extend beyond their respective pairs of secondary points 530. For example, the line segment 610b passes through the secondary points 530-8 and 530-9 (with a distance $d_{614b}$ between the secondary points 530-8 and 530-9) an extends a further distance $d_{612}$ in each direction to endpoints 616ba and 616bb of the line segment 610b (for a total distance of $d_{614b}+(2\times d_{612})$ between the endpoints 616ba and 616bb). This provides an artificial and controlled perturbation in the reconstructed estimated edge 620 comprising the line segments 610.

In some examples, the distance $d_{612}$ is a fixed value, such as 20 pixels. In some examples, the distance $d_{612}$ is determined based on the distance $d_{614b}$ between the pair of secondary points 530-8 and 530-9; for example, the distance $d_{612}$ may be calculated as a fixed fraction of the distance $d_{614b}$. In some examples, the distance $d_{612}$ is determined based on which portion(s) of the skeleton model 432 are located near or nearest to the pair of secondary points 530-8 and 530-9; for example, a larger distance may be used for secondary points 530 near the joint 434a for a head than for secondary points 530 near an arm bone. This may provide a more accurate or complete segmentation for various body parts. In some examples, the distance $d_{612}$ is determined based on a size of a portion of the skeleton model 432; for example, the distance $d_{612}$ may be proportional to a length of the bone 436a to reflect a larger size of the foreground subject 304 in the current frame 317. In some implementations, the line segments 610 may have a thickness (for example, 4 pixels) that further expands a marked area. Although the line segments 610 are depicted graphically in FIG. 6, the skeleton-based reconstructor 332 generates and operates on values characterizing or representative of each line segment 610, such as, but not limited to, a position of one or both endpoints 616 of the line segment 610, a midpoint position, a slope, a normal direction, and/or a length.

Other techniques may be used, individually or in combination with other techniques, for reconstructing an estimated edge from sparsely distributed secondary points 530. For example, morphological dilation of the secondary points 530, in some examples with dilation preferentially directed toward portions of the skeleton model 432, may be used to reconstruct an estimated edge. As another example, more than two secondary points 530 may be linked together with a curve such as a polyline or a spline, with or without extending beyond the linked points as discussed in connection with the extended the distance $d_{612}$. In some implementations, based upon proximity of secondary points 530 to certain features (for example, joints and/or bones) of the skeleton model 432 and/or particular arrangements of portions of the skeleton model 432 a technique may be selected from one of a plurality of such techniques and/or one or more parameters for a technique may adjusted. For example, arcs or other curves may be used instead of straight lines for secondary points 530 near the joint 434a for the head to better conform to the curvature of the head. As another example, convex or concave curves may be selected for connecting secondary points 530 based upon angles of nearby bones, in order to more closely conform to an expected outline of the body in that area.

Figure 7:
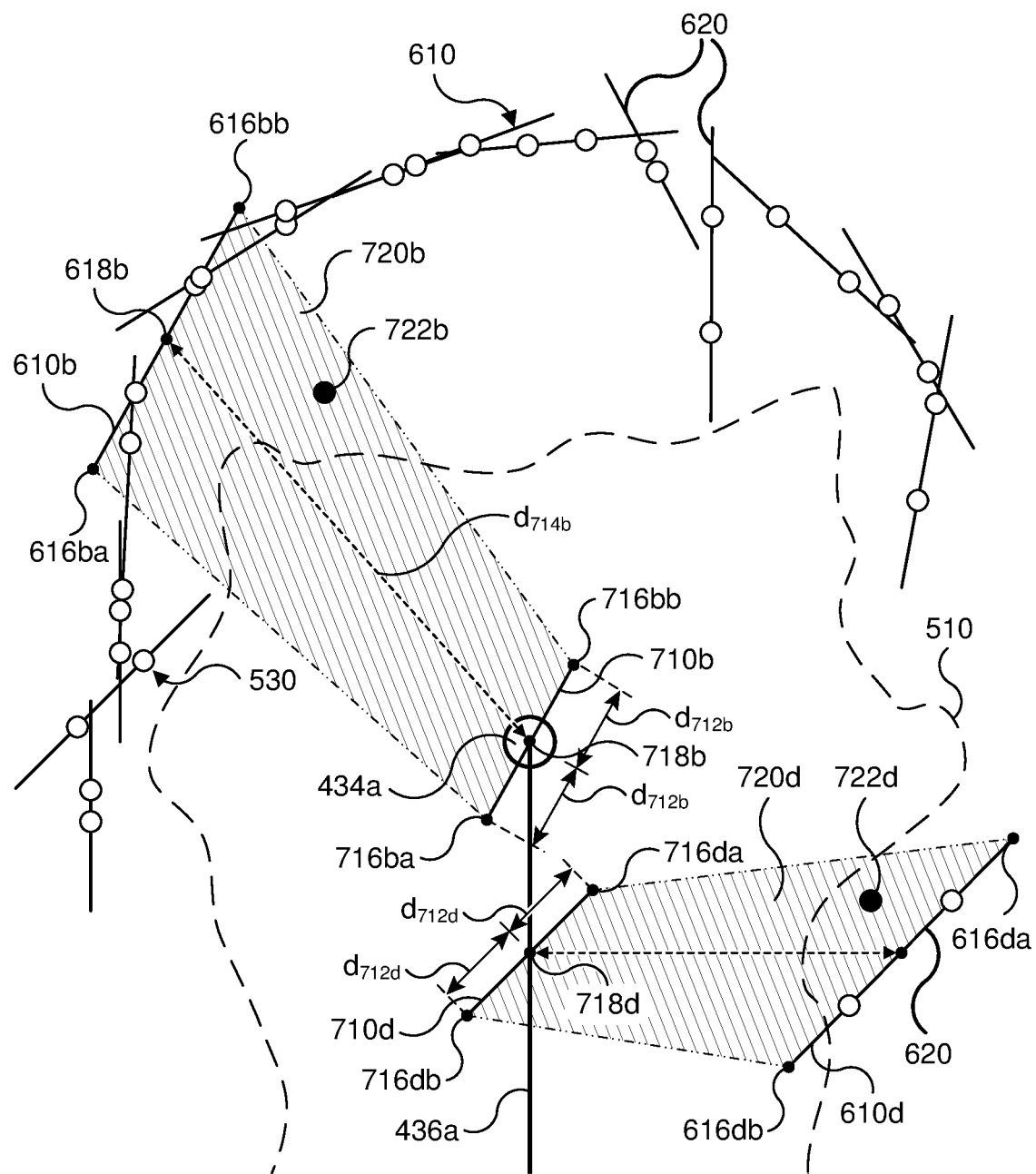
FIG. 7 illustrates identification of portions of a supplemental foreground mask performed as part of the skeleton-based foreground mask reconstruction performed by the skeleton-based reconstructor in FIG. 3.

FIG. 7 continues the example illustrated in FIGS. 4-6, and illustrates identification of portions of a supplemental foreground mask performed as part of the skeleton-based foreground mask reconstruction performed by the skeleton-based reconstructor 332 in FIG. 3. In this example, various points are selected based on the points being positioned between the reconstructed estimated edge 620 identified in FIG. 6 and one or more features of the skeletal model 432. The identified points, between the estimated edge 620 (determined based on, and including the sparse set of secondary points 530) and the skeleton model 432, are combined with the initial foreground mask 510. In some implementations, for each of the line segments 610 a respective portion of the supplemental foreground mask is identified, as shown in FIG. 7 for the second line segment 610b and its resulting portion 720b (which may be referred to as a region or area) of the supplemental foreground mask, and for the fourth line segment 610d and its resulting portion 720d of the supplemental foreground mask.

For the second line segment 610b, a corresponding skeleton point 718b on or near a feature of the skeleton model 432 is identified. In some implementations, the point on or near a feature of the skeleton model 432 with the shortest distance to the second line segment 610b is selected as the skeleton point 718b for the second line segment 610b. In some examples, is shown in FIG. 7, a midpoint 618b of the line segment 610b is used to identify the closest point of the skeleton model 432 (for example, a closest joint and/or a closest point on a bone). For the second line segment 610b, the joint 434a and/or a top end of the bone 436a is identified as being closest to the midpoint 618b and used as the skeleton point 718b. Other approaches may be used to identify the point 718b. In some implementations, multiple skeleton points 718 may be identified for a line segment 610. For example, a skeleton point 718 may be identified for each of the endpoints 616ba and 616bb in the manner described above for the midpoint 618b.

In some implementations, a line segment 710b passing through the skeleton point 718b, or otherwise contacting a feature of the skeleton model 432, is identified and used to identify a quadrilateral portion 720b of the supplemental foreground mask for the second line segment 610b. The identified portion 720b corresponds to an area between the line segment 710b and the second line segment 610b. In some examples, a length of the line segment 710b (in FIG.

7, twice a distance $d_{712b}$) is a predetermined length, such as a number of pixels). In some examples, the length of the line segment 710b is determined based on at least a length of the second line segment 610b. In some examples, the length of the line segment 710b is based on at least a distance $d_{714b}$ between the line segment 610b and the skeleton point 718b. In some examples, the length of the line segment 710b is determined based on at least which feature or features of the skeleton model 432 corresponds to the skeleton point 718b and/or an arrangement of the skeleton model 432, much as they were described as affecting a length of a line segment 610 in FIG. 6. In some examples, as illustrated in FIG. 7, the line segment 710b is substantially parallel to the second line segment 610b, and the portion 720b of the supplemental foreground mask for the second line segment 610b is a trapezoid, although the techniques described herein are not limited to such arrangement of the line segment 710b.

In implementations involving identifying the line segment 710b for the second line segment 610b, the endpoints 716ba and 716bb of the line segment 710b and the endpoints 616ba and 616bb of the second line segment 610b define the quadrilateral portion 720b of the supplemental foreground mask. The portion 720b and/or supplemental points within the portion 720b, such as a supplemental point 722b not included in the initial foreground mask 510 (among other such points), are included in the supplemental foreground mask and combined with the initial foreground mask 510.

The other line segments 610 are handled in the same manner as described above for the second line segment 610b. An example of a supplemental foreground mask resulting from all of the line segments 610 is shown FIG. 9. As shown in FIG. 7, for the fourth line segment 610d, the closest point of a feature of the skeleton model 432 is the skeleton point 718d on the bone 436a. A line segment 710d, with a length twice a distance $d_{712}b$, endpoints 716da and 716db, and substantially parallel to the fourth line segment 610d, define a quadrilateral portion 720d of the supplemental foreground mask including a supplemental point 722d not included in the initial foreground mask 510. It is understood that variations of the use of line segments 610 and corresponding line segments such as the line segments 710b and 710d may be employed to similar effect for identifying supplemental points for combination, and that such variations are within the scope of this disclosure.

Figure 8A:
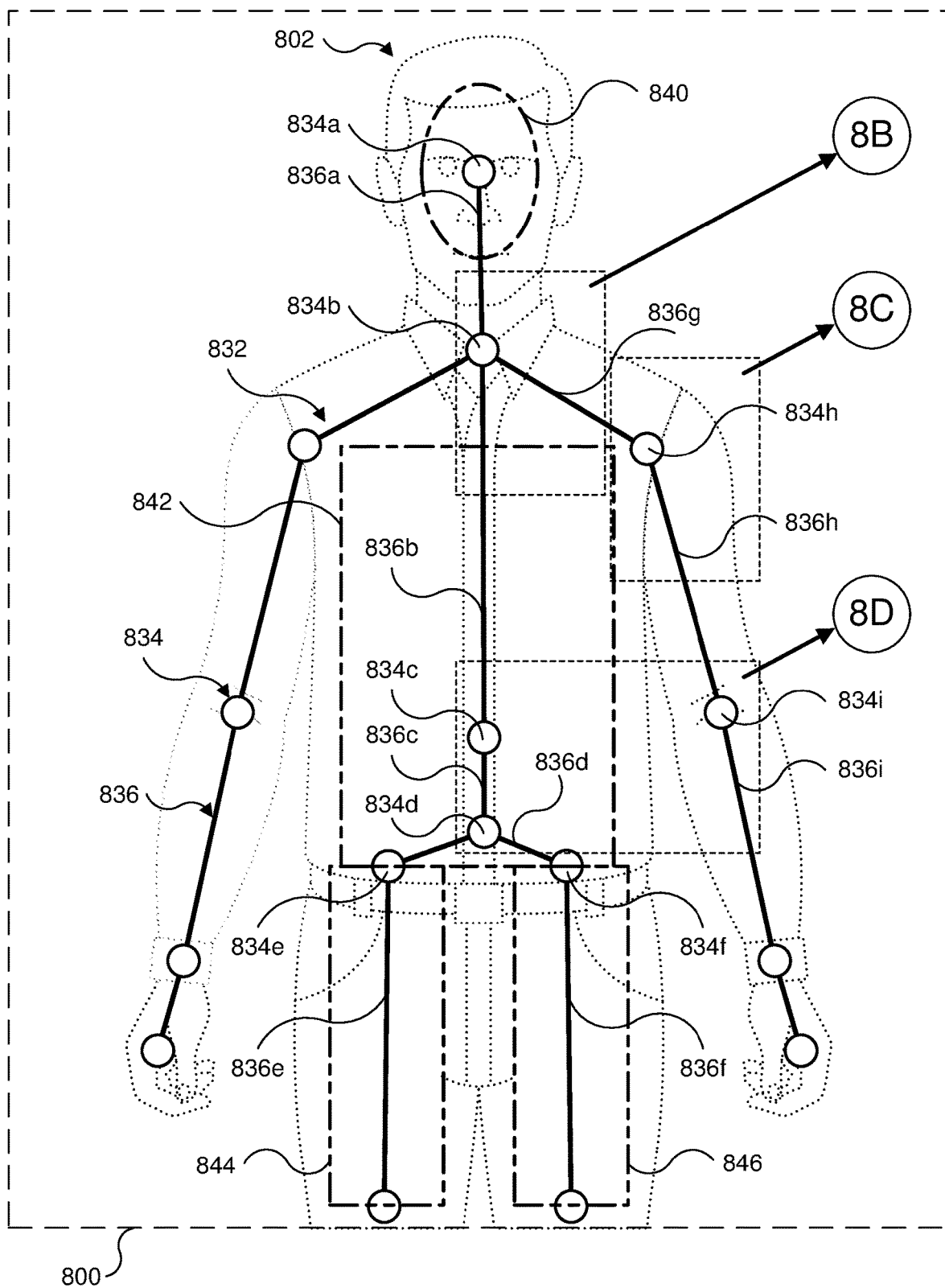
FIGS. 8A-8D illustrate examples of the techniques described in connection with FIGS. 6 and 7 as applied to various portions of another skeleton model.

FIGS. 8A-8D illustrate examples of the techniques described in connection with FIGS. 6 and 7 as applied to various portions of another skeleton model 832. The examples described in FIGS. 8A-8D may be applied in combination with the systems and techniques described in FIGS. 1-7. FIG. 8A illustrates a skeleton model 832 for a foreground subject 802 in a portion 800 of an RGB image. The skeleton model 832 may be generated as described in connection with the skeleton model generator 326 and the skeleton model 327 in FIG. 6. The skeleton model 832 includes joints 834, similar to joints 134 in FIG. 1 and joint 434a in FIGS. 4-7 including a head joint 834a, a neck joint 834b, a spine joint 834c, a central hip joint 834d, lateral hip joints 834e and 834f, shoulder joint 834h, and elbow joint 834i. The skeleton model 832 also includes bones 836 between selected joints 834, similar to bones 136 in FIG. 1 and bone 436a in FIGS. 4-7, including neck bone 836a, spine bone 836b, lower back bone 836c, hip bone 836d, thigh bone 836f, shoulder bone 836g, upper arm bone 836h, and lower arm bone 836i.

In some examples, the skeleton model 832 may include other features in addition to, or instead of, joints 834 and/or bones 836. In the example shown in FIG. 8, the skeleton model 832 further includes a first head region 840 (similar to region 520 in FIG. 5), a torso region 842, a first leg region 844, and a second leg region 846. In some examples, regions 840, 842, 844, and/or 846 may be determined based on positions and arrangements of joints 834 and bone 836. In some examples, other approaches, such as distance ranges, thresholds, and/or offsets may be applied to similar effect as the regions 840, 842, 844, and/or 846.

Figure 8B:
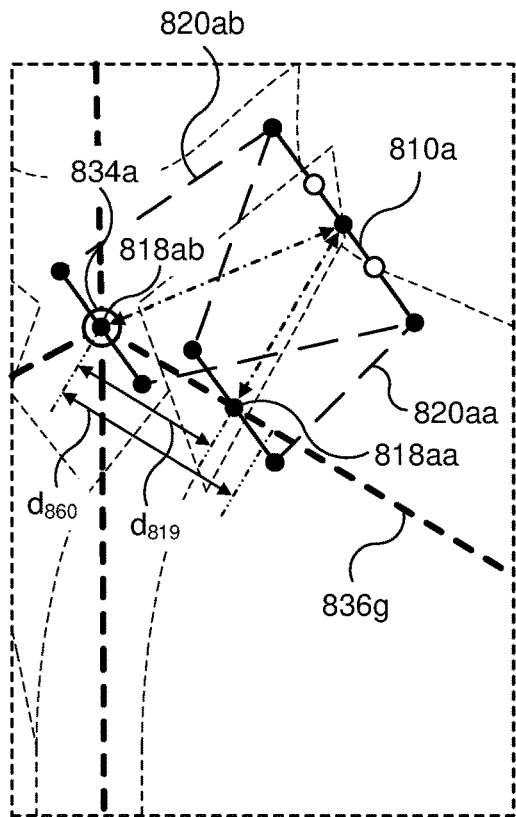
Figure 8C:
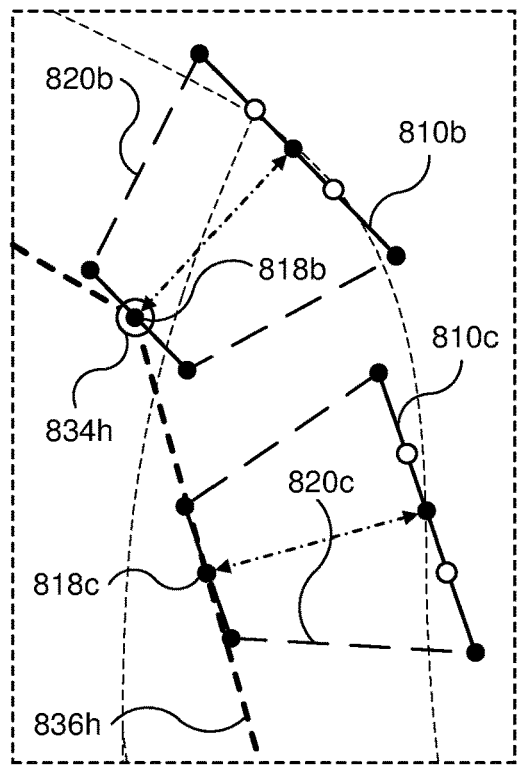
Figure 8D:
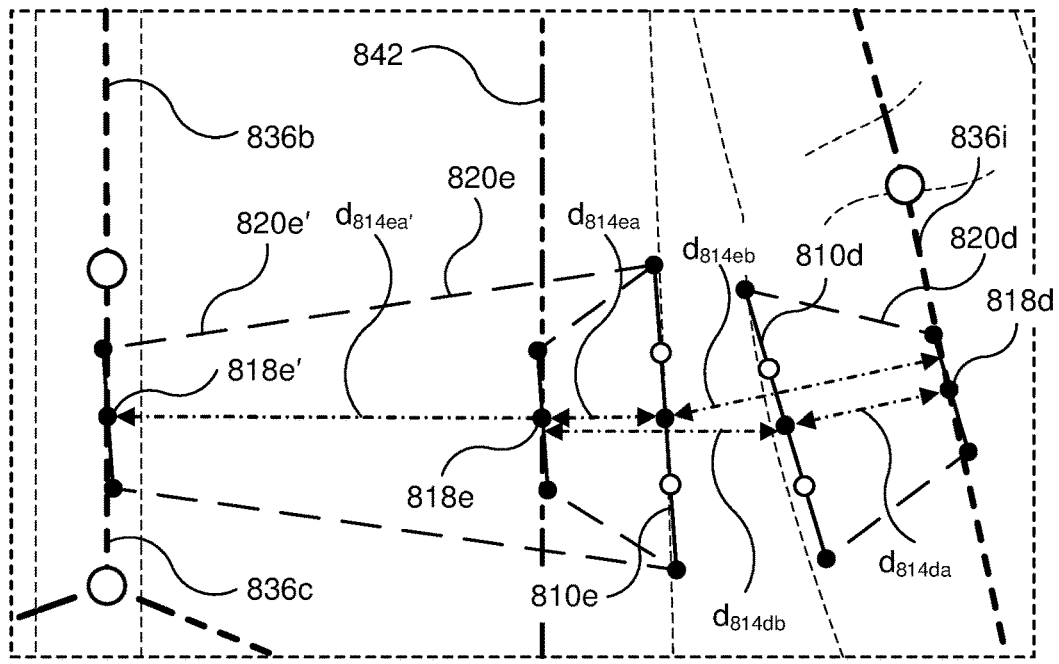

Three areas of FIG. 8A are illustrated in more detail in FIGS. 8B, 8C, and 8D. Line segments 810a, 810b, 810c, 810d, and 810e are each identified as described for line segments 610 in FIG. 6. FIG. 8B illustrates an example of identifying a region of a supplemental foreground mask for the line segment 810a located near a neck joint 834a. The closest skeletal point 818aa is on bone 836g and, following the techniques described in FIGS. 6 and 7, results in identifying a quadrilateral portion 820aa of the supplemental foreground mask. In some implementations, a joint distance $d_{819}$ from the nearby joint 834a is determined for the skeletal point 818aa and if the joint distance $d_{819}$ is less than or equal to a joint distance threshold $d_{860}$ (which may be referred to as a "joint radius"), a second skeletal point 818ab is identified at the joint 834a. The second skeletal point 818ab results in identifying a second quadrilateral portion 820ab.

In some examples, in response to the joint distance $d_{819}$ being less than or equal to the joint distance threshold $d_{860}$, the second portion 820ab is identified as the region of the supplemental foreground mask for the line segment 810a instead of the first portion 820aa. In some examples, in response to the joint distance $d_{819}$ being less than or equal to the joint distance threshold $d_{860}$, the combined portions 832aa and 820ab are identified as the region of the supplemental foreground mask for the line segment 810a. By combining the portions 820aa and 820ab, a more complete supplemental foreground mask may be identified around joints 834. In some examples, the joint distance threshold $d_{860}$ is a predetermined value, such as a number of pixels. In some examples, each joint 834 is associated with a respective joint distance threshold which may vary across joints 834. In some examples, the joint distance threshold $d_{860}$ is determined based on at least a length of a bone 836, such as the bone 836 on which a closest skeletal point lies.

FIG. 8C illustrates examples of identifying regions of a supplemental foreground mask for the two line segments 810b and 810c located near a shoulder joint 834h. For the line segment 810b, a skeleton point 818b at the joint 834h and a portion 820b are identified, much as described in connection with the line segment 610b and the portion 720b in FIG. 7. For the line segment 810c, a skeleton point 818c on the bone 836h and a portion 820c are identified, much as described in connection with the line segment 610d and the portion 720d in FIG. 7.

FIG. 8D illustrates examples of identifying regions of a supplemental foreground mask for the two line segments 810d and 810e located between the two bones 836c and 836i. For the line segment 810d, in response to a distance $d_{814da}$ between a midpoint of the line segment 810d and the bone 836i being less than a distance $d_{814db}$ between the midpoint of the line segment 810d and the region 842, the skeleton point 818d on the bone 836i and a portion 820d of the supplemental foreground mask are identified. For the line segment 810e, in response to a distance $d_{814ea}$ between a midpoint of the line segment 810e and the region 842 being less than a distance $d_{814eb}$ between the midpoint of the line segment 810e and the bone 836i, the skeleton point 818e on a perimeter of the region 842 and a portion 820e of the supplemental foreground mask are identified. It is noted that a different result could occur without the region 842, as a distance $d_{814ea}'$ between the midpoint of the line segment 810e and the bone 836c is substantially greater than the distance $d_{814eb}$.

In some examples, the joint 836c may be associated with the region 842, and in response to that association and the proximity of the line segment 810e to the region 842, a skeletal point 818e' is used instead of a skeletal point on the perimeter of the region 842. This results in a substantially larger portion 820e' of the supplemental foreground mask being identified for the line segment 810e. In such examples, the association of the region 842 with the bone 836c better ensures that skeletal points on the bone 836c are appropriately identified for line segments despite being at significant distances from the bone 836c. Regions such as the region 842 may be associated with any of one or more features of the skeletal model 832.

Figure 9:
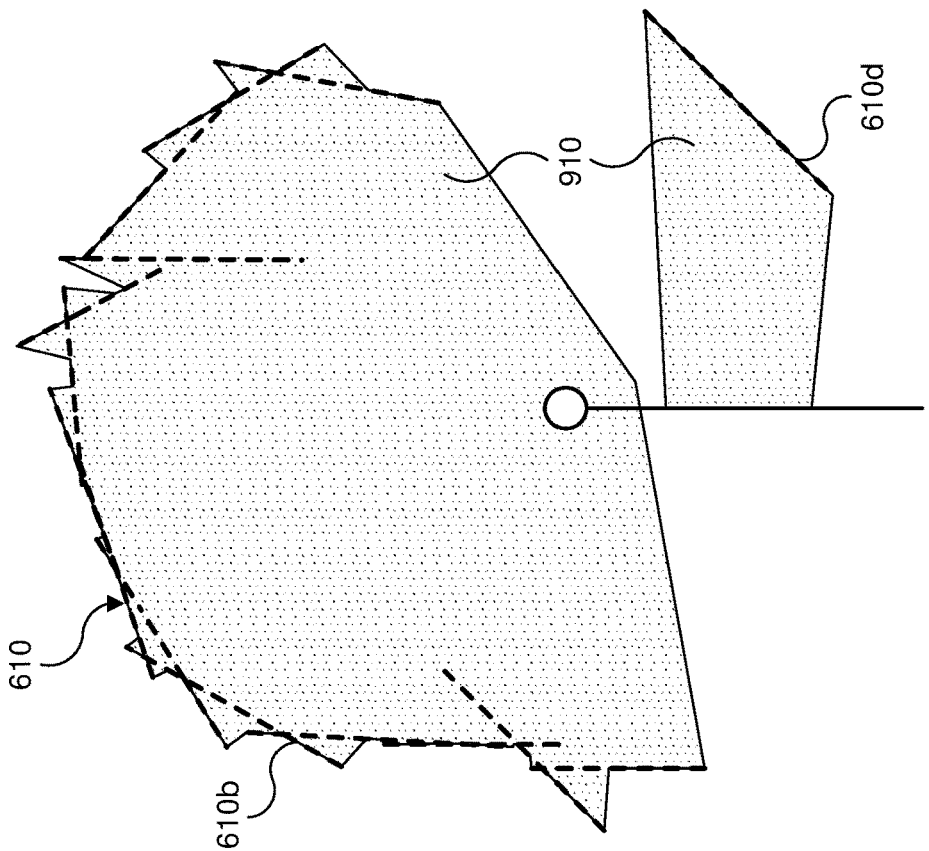
FIG. 9 illustrates a supplemental foreground mask resulting from the combination of all the portions of the supplemental foreground mask identified for the line segments shown in FIGS. 6 and 7.

FIG. 9 continues the example illustrated in FIGS. 4-7, and illustrates a supplemental foreground mask 910 resulting from the combination of all the portions of the supplemental foreground mask 910 identified for the line segments 610 (including, for example, line segments 610b and 610d, as described in FIG. 7. A similar supplemental mask 333 may be produced by the skeleton-based reconstructor 332 in FIG. 3. FIG. 10 continues the example illustrated in FIGS. 4-7 and 9, and illustrates a combined rough foreground mask 1010 resulting from combining the initial foreground mask 510 and the supplemental foreground mask 910. For example, such a combination may be performed by the foreground mask combiner 334 described in FIG. 3. In this example, there is a first portion 920 of the supplemental mask 910 consisting of supplemental points not included in the initial foreground mask 510 (including, for example, the supplemental point 722b shown in FIG. 7). The first portion 920 captures supplemental points, such as hair, that were not captured in the initial foreground mask 510 generated based on a depth image. There is also second portion 922 of the supplemental mask 910 consisting of supplemental points not included in the initial foreground mask 510 (including, for example, the supplemental point 722d shown in FIG. 7). The second portion 922 captures points further to an edge of the foreground subject than in the neighboring portions of the initial foreground mask 510. Each of the first portion 920 and the second portion 922 includes supplemental points positioned between the estimated edge 620 in FIGS. 6 and 7 and the initial foreground mask 510.

Figure 11:
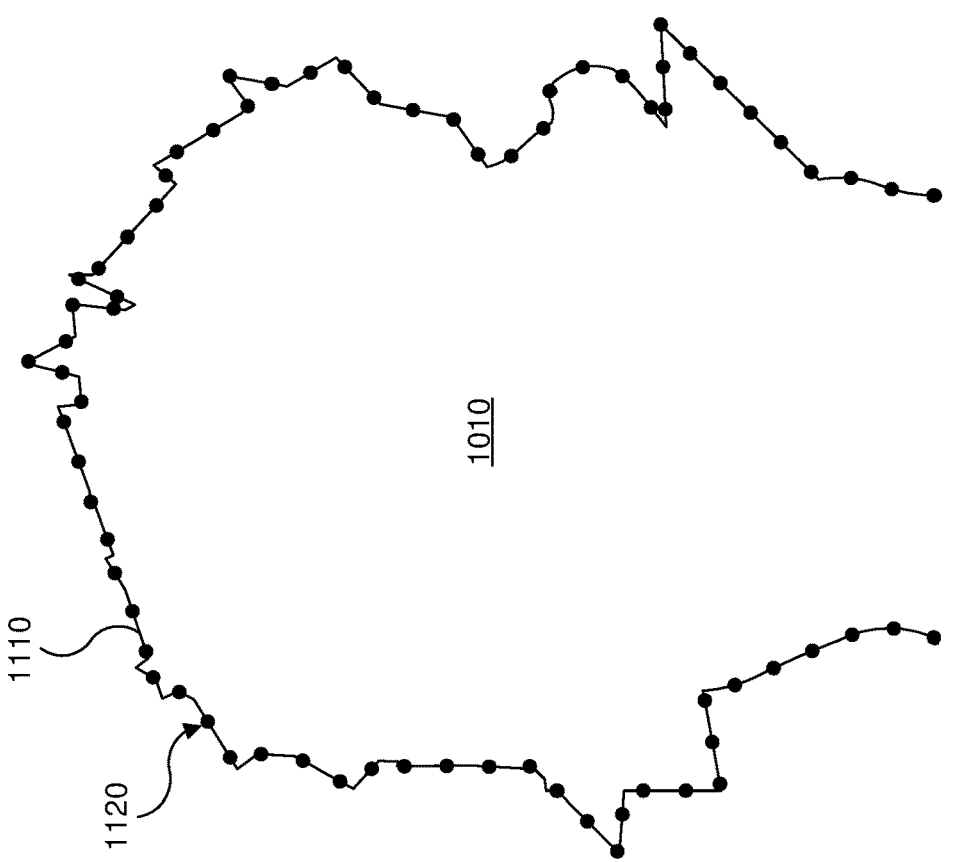
FIG. 11 illustrates a portion of a smoothing of the combined rough foreground mask in FIG. 10 performed by the mask boundary smoother in FIG. 3.

FIG. 11 continues the example illustrated in FIGS. 4-7, 9, and 10, and illustrates a portion of a smoothing of the combined rough foreground mask 1010 in FIG. 10 performed by the mask boundary smoother 336 in FIG. 3. FIG. 11 illustrates a plurality of rough edge points 1120 identified along a perimeter 1110 of the combined rough foreground mask 1010. In some implementations, a larger number of points along the perimeter 1110 of the combined rough foreground mask 1010 is downsampled to determine the rough edge points 1120 for the combined rough foreground mask 1010. For example, the larger number of points may be downsampled by a factor of about 2.

Figure 12:
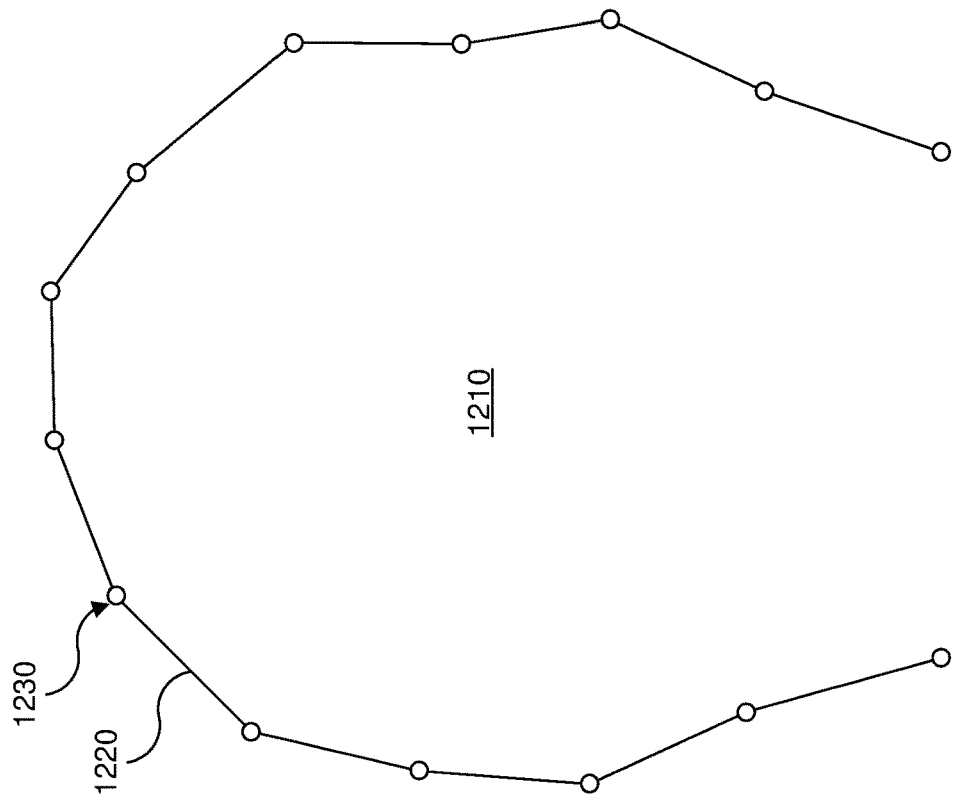
FIG. 12 illustrates a smoothed mask boundary generated by the mask boundary smoother in FIG. 3 based on the rough edge points identified in FIG. 11.

FIG. 12 continues the example illustrated in FIGS. 4-7 and 9-11, and illustrates a smoothed mask boundary 1220 generated by the mask boundary smoother 336 in FIG. 3 based on the rough edge points 1120 identified in FIG. 11. In some implementations, as in the example shown in FIG. 12, the smoothed mask boundary 1220 connects a plurality of smoothed mask boundary nodes 1230 (which may be referred to as points) and may be used to determine a perimeter of a smoothed mask 1210. In such implementations, the smoothed mask boundary nodes 1230 may be referred to as the "smoothed mask boundary," as the smoothed mask boundary nodes 1230 alone may suffice to determine the smoothed mask 1210, including its edges. Although FIG. 12 shows straight lines connecting the smoothed mask boundary nodes 1230, other curves, such as arcs or splines, may be used to connect the smoothed mask boundary nodes 1230. In some examples, a polygon mask may be computed from the smoothed mask boundary nodes 1230 to generate the smoothed mask 1210. The smoothed mask 1210 may be output by the mask supplementer 330 as the preliminary foreground segment mask 338. In some examples, the smoothed mask 1210 is a binary mask (which may be referred to as a "bitmap"), indicating whether individual pixels in the current frame are included in a respective foreground segment.

In some implementations, the smoothed mask boundary nodes 1230 are generated by applying a slide-window finite impulse response (FIR) filter, such as a Savitzky-Golay filter, to the rough edge points 1120. In some examples, x positions and y positions for the rough edge points 1120 may be stored in respective x and y arrays, and the FIR filter applied to the x array and the y array. In some examples, a sliding window of approximately 49 samples may be used for the FIR filter. In some examples, the resulting smoothed x and y arrays may be downsampled to obtain the smoothed mask boundary nodes 1230. For example, the smoothed x and y arrays may be downsampled by a factor of about 20 to compensate the missing measurement of local secondary points.

It is noted that the techniques described in connection with FIGS. 3-12 for the feature detector 320 and the mask supplementer 330 have been presented in a form to facilitate the reader's understanding. However, the described operations may be performed in different orders and/or using other operations that obtain a similar result. For example, although creation of the supplemental foreground mask 910 and combination of the supplemental foreground mask 910 with the initial foreground mask 510 is described, in some implementations no separate supplemental foreground mask is generated, and instead identified supplemental portions (for example, portions 720b and 720d in FIG. 7) and/or supplemental points (for example, supplemental points 722b and 722d) are instead directly combined into the initial foreground mask 510 to generate the combined rough foreground mask 1010.

Figure 13:
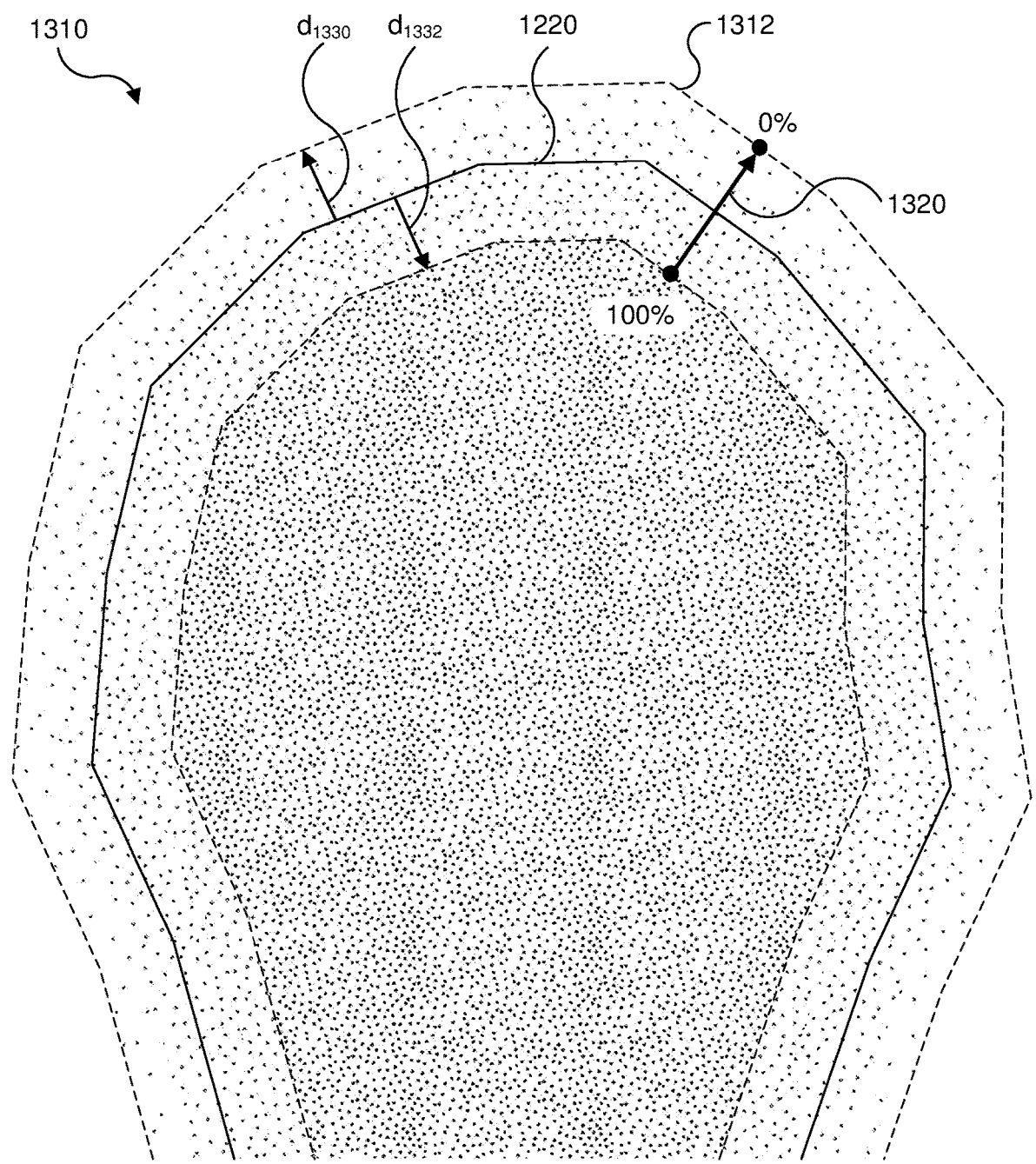
FIG. 13 illustrates an example of generating a foreground segment alpha mask from the smoothed mask from FIG. 12 performed by the edge gradient module in FIG. 3.

FIG. 13 continues the example illustrated in FIGS. 4-7 and 9-12, and illustrates an example of generating a foreground segment alpha mask 1310 from the smoothed mask 1210 from FIG. 12 performed by the edge gradient module 340 in FIG. 3. Based on the smoothed mask boundary 1220, such as by generating a binary mask for the smoothed mask boundary 1220, the edge gradient module 340 creates a gradient 1320 across and/or around the smoothed mask boundary 1220. The size of the gradient 1320 is exaggerated in FIG. 13 for convenience of illustration. The gradient 1320 transitions from a 100 percent alpha level (with 0% transparency) to a 0 percent alpha level (with 100% transparency) at the perimeter 1312 of the resulting foreground segment alpha mask 1310. The gradient 1320 transition may be linear or follow a predetermined curve. In some examples, the gradient 1320 extends a first distance $d_{1330}$ outward from the smoothed mask boundary 1220 and a second distance $d_{1332}$ inward from the smoothed mask boundary 1220. In some examples, the first distance $d_{1330}$ is approximately equal to the first distance $d_{1330}$. In some implementations, the gradient 1320 is generated by convolving the smoothed mask boundary 1220 with a Gaussian filter. The gradient 1320 included in the foreground segment alpha mask 1310 alleviates mismatches between the foreground image portion 346 and the background image 350 in FIG. 3.

Figure 14:
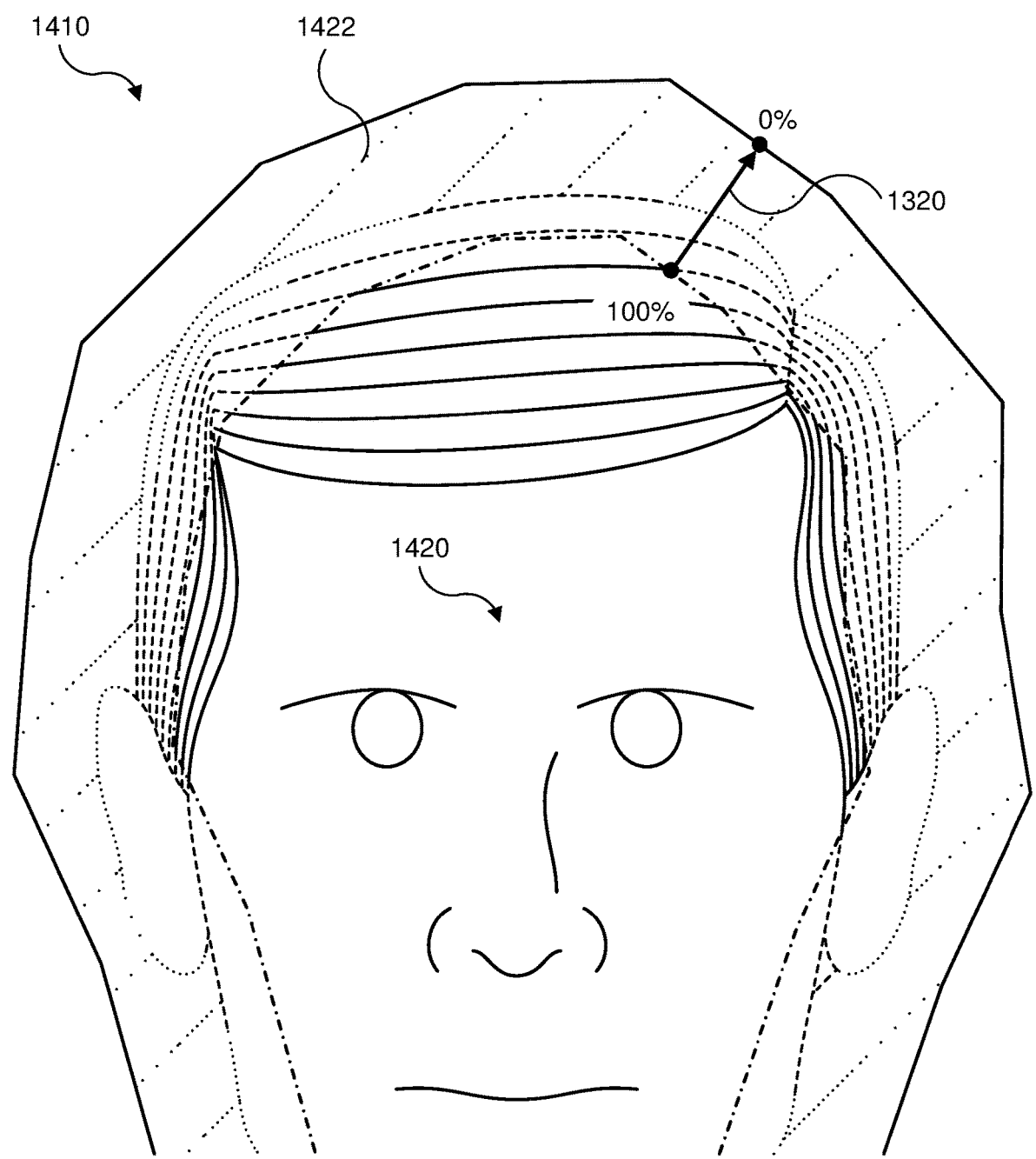
FIG. 14 illustrates an example of applying the foreground segment alpha mask in FIG. 13 to a current frame (of which a portion is shown in FIG. 4) performed by the foreground image generator in FIG. 3.

FIG. 14 continues the example illustrated in FIGS. 4-7 and 9-13, and illustrates an example of applying the foreground segment alpha mask 1310 in FIG. 13 to a current frame (of which a portion 410 is shown in FIG. 4) performed by the foreground image generator 344 in FIG. 3. A simple masking operation is performed, which results in a foreground image 1410. The gradient 1320 is applied at edges of the foreground image 1410, resulting in a central portion 1420 of the foreground image 1410 having no transparency and a blending slope to full transparency across the gradient 1320. In a peripheral portion 1422 of the foreground image 1410 some of the background portion 302 is captured, but its visibility in a composite image 360 is significantly reduced by the blending slope.

Figure 15:
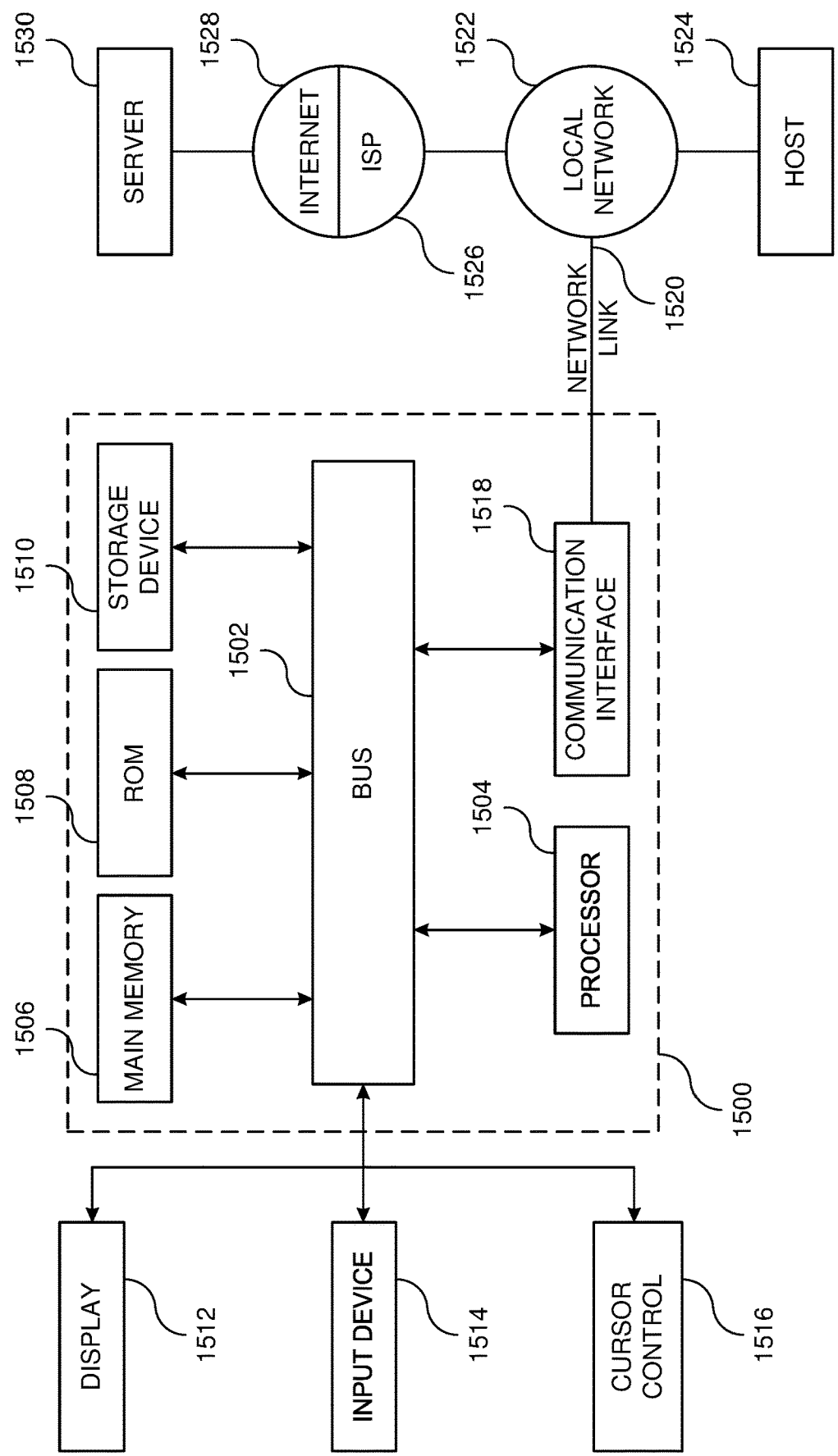
FIG. 15 illustrates a block diagram showing an example computer system upon which aspects of this disclosure may be implemented.

FIG. 15 illustrates a block diagram showing an example computer system 1500 upon which aspects of this disclosure may be implemented. Computer system 1500 includes a bus 1502 or other communication mechanism for communicating information, and a processor 1504 coupled with bus 1502 for processing information. Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. The computer system 1500 can implement, for example, one or more of, or portions of video capture systems 200 and 300, remote display system 260, and/or remote endpoint(s) 390.

Computer system 1500 can further include a read only memory (ROM) 1508 or other static storage device coupled to bus 1502 for storing static information and instructions for processor 1504. A storage device 1510, such as a flash or other non-volatile memory can be coupled to bus 1502 for storing information and instructions.

Computer system 1500 may be coupled via bus 1502 to a display 1512, such as a liquid crystal display (LCD), for displaying information. One or more user input devices, such as the example user input device 1514 can be coupled to bus 1502, and can be configured for receiving various user inputs, such as user command selections and communicating these to processor 1504, or to a main memory 1506. The user input device 1514 can include physical structure, or virtual implementation, or both, providing user input modes or options, for controlling, for example, a cursor, visible to a user through display 1512 or through other techniques, and such modes or operations can include, for example virtual mouse, trackball, or cursor direction keys.

The computer system 1500 can include respective resources of processor 1504 executing, in an overlapping or interleaved manner, respective program instructions. Instructions may be read into main memory 1506 from another machine-readable medium, such as storage device 1510. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media can include, for example, optical or magnetic disks, such as storage device 1510. Transmission media can include optical paths, or electrical or acoustic signal propagation paths, and can include acoustic or light waves, such as those generated during radio-wave and infra-red data communications, that are capable of carrying instructions detectable by a physical mechanism for input to a machine.

Computer system 1500 can also include a communication interface 1518 coupled to bus 1502, for two-way data communication coupling to a network link 1520 connected to a local network 1522. Network link 1520 can provide data communication through one or more networks to other data devices. For example, network link 1520 may provide a connection through local network 1522 to a host computer 1524 or to data equipment operated by an Internet Service Provider (ISP) 1526 to access through the Internet 1528 a server 1530, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for foreground image segmentation, the system comprising:
   an imaging camera configured to capture image data at a first time;
   a skeleton model generator configured to generate a skeleton model of a foreground subject captured in the image data;
   an initial foreground mask generator configured to generate an initial foreground mask for a foreground segment including the foreground subject;
   a secondary point generator configured to generate a first plurality of secondary points corresponding to the foreground subject;
   a foreground segmenter comprising:
      a skeleton-based reconstructor configured to identify supplemental points for the foreground segment based on at least the first plurality of secondary points and the skeleton model, and
      a foreground mask combiner configured to combine the supplemental points with the initial foreground mask to obtain a combined mask,
      wherein the foreground segmenter is configured to obtain a foreground segment mask for the foreground subject based on the combined mask; and
      wherein the skeleton-based reconstructor is configured to reconstruct an estimated edge of the foreground segment mask based on at least the first plurality of secondary points; and
   a foreground image generator configured to apply the foreground segment mask to the image data to obtain a foreground image portion for the foreground subject.

2. The system of claim 1, wherein the secondary point generator is further configured to:
   generate a second plurality of secondary points corresponding to the foreground subject; and
   select the first plurality of secondary points from the second plurality of secondary points based on proximities of the first plurality of secondary points to features included in the skeleton model.

3. The system of claim 1, wherein the skeleton-based reconstructor is further configured to:
   select the supplemental points based on the supplemental points being positioned between the estimated edge and one or more features of the skeleton model.

4. The system of claim 3, wherein the skeleton-based reconstructor is further configured to reconstruct the estimated edge by connecting groups of two or more of the first plurality of secondary points, with each group of secondary points being connected by a curve passing through and extending beyond the group of secondary points.

5. The system of claim 3, wherein the skeleton-based reconstructor is further configured to:
   reconstruct the estimated edge by connecting pairs of the first plurality of secondary points with respective line segments; and
   identify the supplemental points by, for each of the line segments, identifying a second line segment contacting a feature of the skeleton model and selecting supplemental points based on the selected supplemental points being within an area between the line segment and the second line segment.

6. The system of claim 1, wherein the secondary point generator is further configured to identify the first plurality of secondary points by motion estimation between the image data and a second image data captured before the first time.

7. The system of claim 1, wherein the foreground segmenter is further configured to:
   identify a plurality of rough edge points around a perimeter of the combined mask;
   perform smoothing of the plurality of rough edge points to obtain a plurality of smoothed edge points; and
   generate the foreground segment mask from the plurality of smoothed edge points.

8. The system of claim 1, further including an image compositor configured to composite the foreground image portion with a background image.

9. The system of claim 1, wherein the secondary point generator is further configured to:
   generate a second plurality of secondary points corresponding to the foreground subject; and
   select the first plurality of secondary points from the second plurality of secondary points based on proximities of the first plurality of secondary points to the initial foreground mask.

10. A method for foreground image segmentation, the method comprising:
   receiving image data captured at a first time;
   generating a skeleton model of a foreground subject captured in the image data;
   generating an initial foreground mask for a foreground segment including the foreground subject;
   generating a first plurality of secondary points corresponding to the foreground subject;
   identifying supplemental points for the foreground segment based on at least the first plurality of secondary points and the skeleton model;
   combining the supplemental points with the initial foreground mask to obtain a combined mask;

obtaining a foreground segment mask for the foreground subject based on the combined mask;

reconstructing an estimated edge of the foreground segment mask based on at least the first plurality of secondary points; and applying the foreground segment mask to the image data to obtain a foreground image portion for the foreground subject.

11. The method of claim 10, further comprising:

generating a second plurality of secondary points corresponding to the foreground subject; and selecting the first plurality of secondary points from the second plurality of secondary points based on proximities of the first plurality of secondary points to features included in the skeleton model.

12. The method of claim 10, further comprising:

selecting the supplemental points based on the supplemental points being positioned between the estimated edge and one or more features of the skeleton model.

13. The method of claim 12, wherein:

the reconstructing the estimated edge includes connecting groups of two or more of the first plurality of secondary points, with each group of secondary points being connected by a curve passing through and extending beyond the group of secondary points.

14. The method of claim 12, wherein:

the reconstructing the estimated edge includes connecting pairs of the first plurality of secondary points with respective line segments; and the identifying the supplemental points includes, for each of the line segments, identifying a second line segment contacting a feature of the skeleton model and selecting supplemental points based on the selected supplemental points being within an area between the line segment and the second line segment.

15. The method of claim 10, wherein the first plurality of secondary points are identified by motion estimation between the image data and a second image data captured before the first time.

16. The method of claim 10, wherein the obtaining a foreground segment mask includes:

identifying a plurality of rough edge points around a perimeter of the combined mask;

performing smoothing of the plurality of rough edge points to obtain a plurality of smoothed edge points; and generating the foreground segment mask from the plurality of smoothed edge points.

17. The method of claim 10, further including compositing the foreground image portion with a background image.

18. The method of claim 10, further comprising:

generating a second plurality of secondary points corresponding to the foreground subject; and selecting the first plurality of secondary points from the second plurality of secondary points based on proximities of the first plurality of secondary points to the initial foreground mask.

19. The method of claim 10, wherein the initial foreground mask is generated based on at least a depth image included in the image data.

20. A nontransitory computer readable medium including instructions recorded thereon which, when executed by one or more processors, cause the processors to perform the method of claim 10.

* * * * *